United States Patent
Takeda

(10) Patent No.: US 8,101,109 B2
(45) Date of Patent: Jan. 24, 2012

(54) SOLUTION CASTING PROCESS

(75) Inventor: Ryo Takeda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 316 days.

(21) Appl. No.: 11/910,221

(22) PCT Filed: Mar. 2, 2006

(86) PCT No.: PCT/JP2006/304534
§ 371 (c)(1),
(2), (4) Date: Sep. 28, 2007

(87) PCT Pub. No.: WO2006/103891
PCT Pub. Date: Oct. 5, 2006

(65) Prior Publication Data
US 2009/0057937 A1    Mar. 5, 2009

(30) Foreign Application Priority Data
Mar. 28, 2005  (JP) ................................. 2005-092257

(51) Int. Cl.
*B29C 41/28* (2006.01)
(52) U.S. Cl. ........ 264/217; 264/212; 264/216; 264/232; 264/234
(58) Field of Classification Search .................. 264/216, 264/217, 212, 232, 234
See application file for complete search history.

(56) References Cited

U.S. PATENT DOCUMENTS

| | | | | |
|---|---|---|---|---|
| 2,680,470 A | * | 6/1954 | Stanton | 156/498 |
| 2003/0057595 A1 | * | 3/2003 | Tsujimoto | 264/217 |
| 2004/0046272 A1 | * | 3/2004 | Arai et al. | 264/28 |
| 2004/0201129 A1 | * | 10/2004 | Kanemura | 264/216 |

FOREIGN PATENT DOCUMENTS

| | | | |
|---|---|---|---|
| JP | 11-138568 A | | 5/1999 |
| JP | 2001-129839 A | | 5/2001 |
| JP | 2003-71863 A | | 3/2003 |
| JP | 2003071863 A | * | 3/2003 |
| JP | 2003-103545 A | | 4/2003 |
| JP | 2003-236862 A | | 8/2003 |

OTHER PUBLICATIONS

JP 2003-071863 A (Machine Translation) [online], [retrieved on Aug. 3, 2009], retrieved from PAJ Database.*

Yasuo Mukunoki, "Cellulose acylate film produced from non-chlorine solvent and method for producing the same, and silver halide photosensitive material, protective film and functional film for electric material, and liquid crystal display using the same" Journal of Invention and Innovation, 2001-1745.

The Second Office Action, dated Sep. 20, 2010, issued in corresponding CN Application No. 200680009649.3, 6 pages in English.

* cited by examiner

Primary Examiner — Richard Crispino
Assistant Examiner — Elizabeth Royston
(74) Attorney, Agent, or Firm — Sughrue Mion, PLLC

(57) ABSTRACT

Solution casting of polymer film (76, 102) is provided. A dope (22, 115-117) containing a polymer of cellulose triacetate and solvent is cast on a casting support band (34, 121) which moves, to form a cast film (69, 122), and then the cast film is stripped from the casting support band and dried, to produce the polymer film. In the solution casting, the cast film is cooled shortly before stripping the cast film from the casting support band. Preferably, a cooling temperature to which the cast film is cooled is set lower than 6 deg. C. The cast film is cooled within a predetermined cooling region, disposed to start at a stripping point for the cast film, and to extend upstream therefrom with a length equal to or less than 25% of the length of the casting support band. The cast film is blown by cooling gas caused to flow for cooling.

9 Claims, 2 Drawing Sheets

SOLUTION CASTING PROCESS

TECHNICAL FIELD

The present invention relates to a solution casting process. More particularly, the present invention relates to a solution casting process capable of producing a polymer film with high optical performance.

BACKGROUND ART

Cellulose acylates are used as a support of polymer film contained in photosensitive materials, such as photographic films, owing to advantageous characteristics, for example rigidity, non-flammability, and the like. A typical example of cellulose acylate is cellulose triacetate (TAC) having an average acetylation degree of 58.0-62.5%. Also, the polymer film of the cellulose triacetate (TAC) is used as a protection film of a polarizing element, or an optical compensation film (view angle enlarging film or the like), any of those being incorporated in a liquid crystal display (LCD) panel. This is effective because of optically utilizing the highly isotropic property of the polymer film.

A solution casting is a widely used method of producing polymer film of the cellulose triacetate (TAC). The solution casting is capable of producing a base film of photosensitive material or transparent sheet on a liquid crystal display panel. A solution casting of producing polymer film of cellulose triacetate (TAC) is typically suggested in JIII Journal of Technical Disclosure Monthly (Japan Hatsumei Kyokai, Kokai Giho), No. 2001-1745. At first, cellulose triacetate (TAC) is dissolved in a mixed solvent of which a main component is dichloromethane, to prepare dope or polymer solution. After this, the dope is cast on a support, to form cast film. Examples of supports are a casting support band and rotatable drum-shaped support. When the cast film dries to have a self-supporting property, a self-supporting cast film is stripped by a stripping roller. The cast film is sufficiently dried and cooled, and wound as a roll of the polymer film.

Generally in solution casting, surface quality of polymer film greatly depends upon a condition of stripping a cast film from the cast film as a self-supporting cast film. It is known as disclosed in JP-A 2003-071863 to set the surface temperature of the rotatable roll in a range of 6-15 deg. C. for cooling, and set time of contact of the cast film on the rotatable roll in a range of 0.5-20 seconds. This is for the purpose of facilitating the stripping of the cast film and also preventing a cloudy state on the polymer film. Also, dew point of a position of the stripping is controlled at a level equal to or less than 7 deg. C., so as to ensure prevention of the cloudy state.

To raise productivity of polymer films, speed of solution casting should be higher and higher. In contrast, high quality and high performance of polymer film as an optical element is desired by recent trends of enlargement of display panels and heightening of precision of displayed images. There occurs a problem of unavailability of polymer film having the intended optical performance in the case of stripping conditioned according to JP-A 2003-071863.

In view of the foregoing problems, an object of the present invention is to provide a solution casting process capable of producing a polymer film with high optical performance.

DISCLOSURE OF INVENTION

In order to achieve the above and other objects and advantages of this invention, a solution casting process is provided, wherein a dope containing a polymer and solvent is cast on a casting support which moves, to form a cast film, and then the cast film is stripped from the casting support and dried, to produce a polymer film. The solution casting process includes a step of cooling the cast film shortly before stripping the cast film from the casting support.

A cooling temperature to which the cast film is cooled is set lower than 6 deg. C.

The casting support is a casting support band.

The cast film is cooled within a predetermined cooling region, disposed to start at a stripping point for the cast film, and to extend upstream therefrom with a length equal to or less than 25% of a length of the casting support band.

The cast film is blown by cooling gas caused to flow for cooling.

In a preferred embodiment, a cooling roll is used for contacting a second surface of the casting support band that is reverse to a first surface for forming the cast film, in order to cool the cast film.

A dew point of a portion around a stripping point of the cast film is set equal to or less than 0 deg. C.

A solvent content of the solvent of a portion of the cast film at a stripping point thereof is set equal to or more than 20 wt. % and equal to or less than 200 wt.% according to a dry base.

In a preferred embodiment, the polymer film is created from two or more cast films overlaid on one another, and is produced by multi casting in which plural dopes are cast at one time, or by multi casting in which plural dopes are cast one after another in positions separate from one another.

The plural dopes include a first dope for being directly cast on the casting support, and at least the first dope contains stripping accelerator among the plural dopes.

The dope contains the stripping accelerator at an amount equal to or more than $1 \times 10^{-4}$ wt. % and equal to or less than 1 wt. % with reference to 100 wt. % of the polymer of the polymer film.

With reference to 100 wt. % of the polymer of the polymer film, the dope contains plasticizer at an amount equal to or more than 3 wt. % and equal to or less than 20 wt. %, ultraviolet absorber at an amount equal to or more than 0.001 wt. % and equal to or less than 5 wt. %, and fine particles at an amount equal to or more than 0.001 wt. % and equal to or less than 5 wt.%.

The polymer is a cellulose acylate.

BEST MODE FOR CARRYING OUT THE INVENTION

[Raw Materials]

Figure 1:
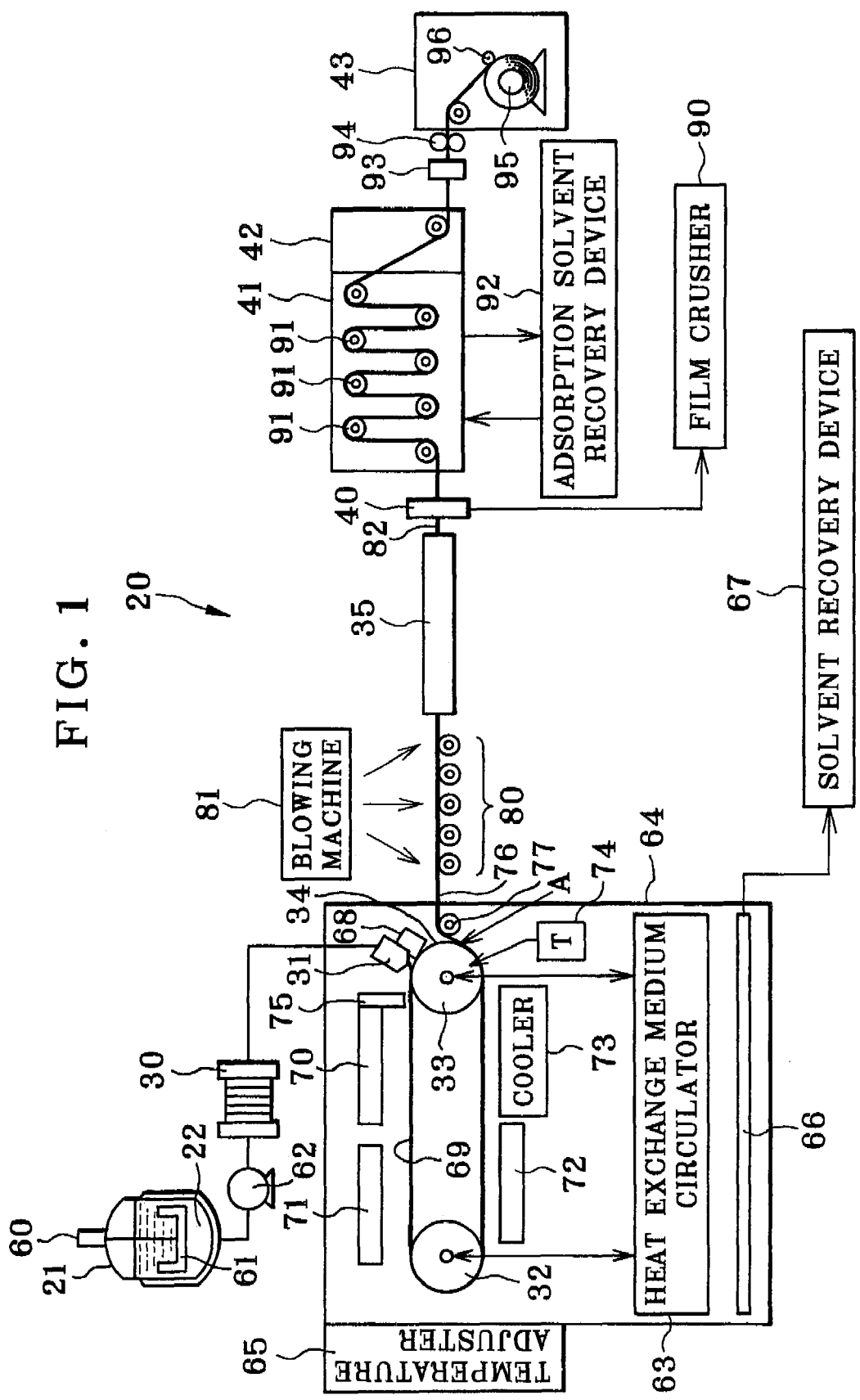
FIG. 1 is an explanatory view illustrating a preferred polymer film producing line of the invention.

Polymers used in the present invention are cellulose acylates, and most preferably, cellulose triacetate (TAC). Preferable examples of cellulose acylates satisfy conditions I-III as follows:

$2.5 \leq A+B \leq 3.0$      I $0 \leq A \leq 3.0$      II $0 \leq B \leq 2.9$      III where A and B represent a degree of substitution of an acyl group (—CO—R) formed by substituting hydroxy groups in cellulose. A represents a degree of substitution of an acetyl group (—CO—CH$_3$) formed by substituting hydroxy groups in cellulose. B represents a total degree of substitution of acyl groups having 3-22 carbon atoms.

According to a preferred embodiment, TAC should include 90 wt. % or more of particles of 0.1-4 mm. Also, polymers in the invention can be not only cellulose acylates but various cellulose esters or other polymeric materials.

The cellulose is constructed by glucose units making a beta-1,4 bond, and each glucose unit has a liberated hydroxy group at second, third and sixth positions. Cellulose acylate is a polymer in which part or whole of the hydroxy groups are esterified so that the hydrogen is substituted by acyl groups. The degree of substitution for the acyl groups in cellulose acylate is a degree of esterification at second, third or sixth position in cellulose. Accordingly, when 100% of the hydroxy group at the same position is substituted, the degree of substitution at this position is 1.

The total degree of substitution DS2+DS3+DS6 for the acyl groups at the second, third or sixth positions is in the range of 2.00-3.00, preferably 2.22-2.90, and in particular preferably 2.40-2.88. The signs DS2, DS3 and DS6 are degrees of substitution for the acyl groups at respectively the second, third or sixth positions in hydroxy groups in the glucose unit. Further, a ratio DS6/(DS2+DS3+DS6) is preferably 0.28 or more, and particularly 0.30 or more, and especially in the range of 0.31-0.34.

Only one example of acyl group may be contained in the cellulose acylate of the invention. However, cellulose acylate may contain two or more examples of the acyl group. If two or more acyl groups are contained, one of the plural acyl groups should be preferably an acetyl group. Let DSA be a total degree of substitution for the acetyl groups. Let DSB be a total degree of substitution for other acyl groups at the second, third or sixth positions than the acetyl groups. The value DSA+DSB is preferably in the range of 2.22-2.90, and particularly in the range of 2.40-2.88. Further, the DSB is preferably at least 0.30, and especially at least 0.7. Furthermore, in the DSB, the percentage of a substituent at the sixth position is preferably at least 20%, particularly at least 25%, especially at least 30% and most especially at least 33%. Further, the value DSA+DSB at sixth position is at least 0.75, particularly at least 0.80, and especially 0.85. Cellulose acylate satisfying the above conditions can be used to prepare a solution (or dope) having a preferable solubility. Especially when chlorine-free type organic solvent is used, the adequate dope can be prepared. Also, the dope can be prepared so as to have a low viscosity and the suitability for filtration becomes higher.

Cellulose to produce cellulose acylates can be obtained any one of linter cotton and pulp cotton, but preferably can be obtained from linter cotton.

Examples of acyl groups in cellulose acylates having two or more carbon atoms can be aliphatic groups, aryl groups, and the like. For example, cellulose acylates may be alkyl carbonyl esters, alkenyl carbonyl esters, aromatic carbonyl esters, aromatic alkenyl carbonyl esters, and the like of cellulose, and can further contain a substitution group. Preferable examples of groups include: propionyl, butanoyl, pentanoyl, hexanoyl, octanoyl, decanoyl, dodecanoyl, tridecanoyl, tetradecanoyl, hexadecanoyl, octadecanoyl, iso-butanoyl, tert-butanoyl, cyclohexane carbonyl, oleoyl, benzoyl, naphthyl carbonyl, and cinnamoyl. Among those, particularly preferable groups are propionyl, butanoyl, dodecanoyl, octadecanoyl, tert-butanoyl, oleoyl, benzoyl, naphthyl carbonyl, and cinnamoyl. Further, specifically preferable groups are propionyl and butanoyl.

Examples of solvents for preparing the dope include:
aromatic hydrocarbons, such as benzene and toluene;
halogenated hydrocarbons, such as dichloromethane and chlorobenzene;
alcohols, such as methanol, ethanol, n-propanol, n-butanol, and diethylene glycol;
ketones, such as acetone and methyl ethyl ketone;
esters, such as methyl acetate, ethyl acetate, and propyl acetate;
ethers, such as tetrahydrofuran and methyl cellosolve.

Note that the term of dope is used herein to mean a solution or dispersion of polymer in a solvent, the composition being obtained by dissolving or dispersing.

Preferable halogenated hydrocarbons for use contain 1-7 carbon atoms. Among those, dichloromethane is desirable. It is preferable in a mixed solvent to mix one or more alcohols containing 1-5 carbon atoms with the dichloromethane, for the purpose of high solubility, easy separability from a support for casting, mechanical strength of film material, various optical characteristics of a cellulose ester. Such alcohols are contained in the mixed solvent preferably in a range of 2-25 wt. %, and desirably in a range of 5-20 wt. %. Preferable examples of alcohols are methanol, ethanol, n-propanol, iso-propanol, n-butanol and the like. Among those, specifically preferable substances are methanol, ethanol, n-butanol, and mixture of two or more of them.

Solvents not containing dichloromethane are effectively used in the publicly suggested manner, for the purpose of minimizing influence to environment. Examples of compounds useful to this end are ethers having 4-12 carbon atoms, ketones having 3-12 carbon atoms, esters having 3-12 carbon atoms, and alcohols having 1-12 carbon atoms. Two or more compounds can be mixed as mixed solvents. Specifically preferable mixed solvents are mixtures of at least two of methyl acetate, acetone, ethanol and n-butanol. Ethers, ketones, esters and alcohols of the examples may have a cyclic structure. Compounds having two or more functional groups of ethers, ketones, esters and alcohols, namely —O—, —CO—, —COO— and —OH, can be used as a solvent.

[Stripping Accelerators]

Preferably, a stripping accelerator is blended in order to reduce load applied in the stripping the film from the casting support band. Examples of stripping accelerators include surface active agents of any type which may be phosphates, sulfonates, carboxylic acid compounds, nonion materials, cation materials or the like. Those are suggested in JP-A 61-243837 and JP-A1-299847.

In relation to stripping accelerators, U.S. Pub. No. 2004/0188881 (corresponding to JP-A 2003-055501) discloses cellulose acylate solutions of which a solvent is chlorine-free, and which contain an additive selected from partly esterified poly-basic acids, salts of alkaline earth metals, and salts of alkaline metals, wherein the partly esterified poly-basic acids show acid dissociation index (pKa) values of 1.93-4.5 when dissolved in water. This is for the purpose of preventing a cloudy state in the cellulose acylate solutions, and obtaining high suitability for stripping in the film production and high quality of film surfaces.

JP-A 2003-103545 discloses production of a cellulose acylate film improved in separability in stripping at the time of production and film surface properties and having no problem from an aspect of durability. In the method of manufacturing the cellulose acylate film by casting two or more layers by a multi casting method, additives A and B are used. The additive A is selected from a partial ester of a polybasic acid of which the acid dissociation index (pKa) in an aqueous solution is 1.93-4.50, an alkali metal salt thereof, and an alkaline earth metal salt thereof, and is added to a solution prepared by dissolving cellulose acylate in a solvent substantially constituted of a chlorine-free solvent and constituting either one of two or more layers. The additive B is a selected one of an amine compound with pKa of 4.50 or more, and an amine compound having substantially no volatility and having a molecular weight of 200 or less per one basic group is added to the solution constituting at least one layer containing no additive A. Note that examples of stripping accelerators usable in the invention include citric acid, citrate esters and the like. As will be described later, only one of plural dopes directly contacting a casting support band in the course of multi casting should preferably contain a stripping accelerator, which facilitates stripping of a cast film without dropping optical performance.

A stripping accelerator can be contained at an amount equal to or more than $1 \times 10^{-4}$ wt. % and equal to or less than 1 wt. % in 100 wt. % of polymer in the polymer film. If the amount of the stripping accelerator is less than $1 \times 10^{-4}$ wt. %, an effect of encouraging stripping of the polymer film will be insufficient. Should the amount of the stripping accelerator be more than 1 wt.%, optical performance of the polymer film will be lower.

[Plasticizers]

Phosphate esters and carboxylic acid esters are preferable. Specifically preferable examples are as follows:

triphenyl phosphate (TPP), tricresyl phosphate (TCP), cresyl diphenyl phosphate, octyl diphenyl phosphate, diphenyl biphenyl phosphate, trioctyl phosphate, tributyl phosphate, dimethyl phthalate (DMP), diethyl phthalate (DEP), dibutyl phthalate (DBP), dioctyl phthalate (DOP), diphenyl phthalate (DPP), and diethyl hexyl phthalate (DEHP); and O-acetyl citric acid triethyl ester (OACTE), O-acetyl citric acid tributyl ester (OACTB), acetyl triethyl citrate, acetyl tributyl citrate, butyl oleate, methyl acetyl ricinolate, dibutyl sebacate, triacetin, tributylin, butyl phthalyl butyl glycolate, ethyl phthalyl ethyl glycolate, methyl phthalyl ethyl glycolate, and butyl phthalyl butyl glycolate.

Also, preferable plasticizers are (di)penta erythritol esters, glycerol esters, and diglycerol esters.

In particular, preferable examples of plasticizers are triphenyl phosphate, biphenyl diphenyl phosphate, and phthalate esters. A plasticizer can be contained at an amount equal to or more than 3 wt. % and equal to or less than 20 wt. % in 100 wt. % of polymer in the polymer film, If the amount of the plasticizer is less than 3 wt. %, an effect of raising the flexibility of the polymer film will be insufficient. Should the amount of the plasticizer be more than 20 wt. %, optical performance of the polymer film will be lower. The plasticizer may be bled out of the polymer film to drop the surface quality.

[UV Absorbers]

In cellulose acylate film, one or more UV absorbers are preferably contained. Since having the dimensional stability, the cellulose acylate film is used in the polarizing filter, the liquid crystal display and the like. In view of the protection of the deterioration of them, the UV absorber is preferably excellent in absorbing UV rays of which a wavelength is equal to or less than 370 nm. Further, in view of the display performance of the LCD, the UV absorber preferably does not absorb visible rays of which a wavelength is equal to or more than 400 nm. Examples of UV absorbers are oxybenzophenone compounds, benzotriazol compounds, salicylate ester compounds, benzophenone compounds, cyanoacrylate compounds, and nickel complex salt compounds.

Specifically preferable examples of benzotriazol UV absorbers are as follows:

2-(2'-hydroxy-5'-methylphenyl) benzotriazol; 2-(2'-hydroxy-3',5'-di-tert-butylphenyl) benzotriazol; 2-(2'-hydroxy-3'-tert-butyl-5'-methylphenyl) benzotriazol; 2-(2'-hydroxy-3',5'-di-tert-butylphenyl)-5-chlorobenzotriazol; 2-(2'-hydroxy-3'-(3",4",5",6"-tetrahydrophthalimidomethyl)-5'-methylphenyl) benzotriazol; 2,2-methylene bis(4-(1,1,3,3-tetramethylbutyl)-6-(2H-benzotriazol-2-yl) phenol); 2-(2'-hydroxy-3'-tert-butyl-5'-methylphenyl)-5-chlorobenzotriazol; 2,4-dihydroxybenzophenone; 2,2'-dihydroxy-4-methoxybenzophenone; 2-hydroxy-4-methoxy-5-sulfobenzophenone; bis(2-methoxy-4-hydroxy-5-benzoylphenylmethane); (2,4-bis-(n-octylthio)-6-(4-hydroxy-3,5-di-tert-butylanilino)-1,3,5-triazine;

2-(2'-hydroxy-3',5'-di-tert-butylphenyl)-5-chlorobenzotriazol; 2(2'-hydroxy-3',5'-di-tert-amylphenyl)-5-chlorobenzotriazol; 2,6-di-tert-butyl-p-cresol; pentaerythrityl-tetrakis [3-(3,5-di-tert-butyl-4-hydroxyphenyl) propionate]; triethylene glycol-bis[3-(3-tert-butyl-5-methyl-4-hydroxyphenyl) propionate]; 1,6-hexanediol-bis[3-(3,5-di-tert-butyl-4-hydroxyphenyl) propionate]; 2,4-bis-(n-octylthio)-6-(4-hydroxy-3,5-di-tert-butylanilino)-1,3,5-triazine; 2,2-thiodiethylene bis[3-(3,5-di-tert-butyl-4-hydroxyphenyl) propionate]; octadecyl-3-(3,5-di-tert-butyl-4-hydroxyphenyl) propionate; N,N'-hexamethylene bis(3,5-di-tert-butyl-4-hydroxy-hydrocinnamide); 1,3,5-trimethyl-2,4,6-tris(3,5-di-tert-butyl-4-hydroxybenzyl) benzene; tris-(3,5-di-tert-butyl-4-hydroxybenzyl)-isocyanurate and the like.

Especially preferable examples are 2,4-bis-(n-octylthio)-6-(4-hydroxy-3,5-di-tert-butylanilino)-1,3,5-triazine; 2(2'-hydroxy-3',5'-di-tert-butylphenyl)-5-chlorobenzotriazol; 2(2'-hydroxy-3',5'-di-tert-amylphenyl)-5-chlorobenzotriazol; 2,6-di-tert-butyl-p-cresol; pentaerythrityl-tetrakis[3-(3,5-di-tert-butyl-4-hydroxyphenyl) propionate]; and triethyleneglycol-bis[3-(3-tert-butyl-5-methyl-4-hydroxyphenyl) propionate].

Further, the following compounds can be used in combination with the above UV-absorbers: metal desactivator of hydrazine type, such as N,N'-bis[3-(3,5-di-tert-butyl-4-hydroxyphenyl) propionyl] hydrazine, processing stabilizers of phosphorus type, such as tris(2,4-di-tert-butylphenyl) phosphate and the like.

As the UV absorbers to be used in the present invention, there are optical stabilizer in catalogue of Adekastab, optical stabilizers and UV absorbers in catalogue of Tinuvin of Ciba Specialty Chemicals Inc., and SEESORB, SEENOX, SEETEC and the like in catalogue of Shipro Kasei Kaisha Ltd. Further, other usable additives are UV absorbers and antioxidants marketed by Johoku Chemical Co., Ltd., VIOSORB marketed by Kyodo Chem. Co. Ltd., and UV absorbers marketed by Yoshitomi Pharmaceutical Ind. Ltd.

Further, JP-A 6-148430 discloses ultraviolet (UV) absorbers which it is preferable to use. The UV absorbers of the document have high transparency and high efficiency for preventing the deterioration of the polarizing filter or the liquid crystal elements. Especially, benzotriazol UV absorbers are preferable owing to reduction of unwanted coloring.

JP-A 2003-043259 discloses the optical film to be used in the polarizing filter and the display device. The optical film is excellent in color reproducibility and endurance in the illumination of the UV ray. In the UV wavelength range, the spectral transmittance of the disclosed optical film is 50-95% at 390 nm, and at most 5% at 350 nm.

Benzophenone compounds and benzotriazol compounds are preferable as ultraviolet (UV) absorbers. An ultraviolet (UV) absorber can be contained at an amount equal to or more than 0.001 wt. % and equal to or less than 5 wt. % in 100 wt. % of polymer in the polymer film, and preferably, at an amount equal to or more than 0.1 wt. % and equal to or less than 3 wt. %, and desirably, at an amount equal to or more than 0.2 wt. % and equal to or less than 3 wt. %. If the amount of the ultraviolet (UV) absorber is less than 0.001 wt. %, prevention of film degradation due to ultraviolet rays will be insufficient. Should the amount of the ultraviolet (UV) absorber be more than 5 wt. %, optical performance of the polymer film will be lower.

[Fine Particles]

Fine particles can be preferably added to cellulose acylate film in the invention particularly for the purpose of preventing scratches, damages or facilitating transport in the course of the handling. Such fine particles have been widely used as matte agents, anti-blocking agents, and smoothing agents to prevent squeak. Any suitable substances can be used as fine particles for this function. However, specifically preferable examples are as follows.

various silicon compounds, silica (silicon dioxide), titanium oxide, zinc oxide, aluminum oxide, barium oxide, zirconium oxide, strontium oxide, antimony oxide, tin oxide, tin/antimony oxide, calcium carbide, talc, clay, sintered kaolin, sintered calcium silicate, hydrated calcium silicate, aluminum silicate, magnesium silicate, and calcium phosphate.

Most preferable examples are inorganic silicon compounds, and zirconium oxide. Among those, silica is particularly acceptable because a cloudy state of the cellulose acylate film can be reduced. Available examples of fine particles of silica include Aerosil R972, R974, R812, 200, 300, R202, OX50 and TT600 (trade names) manufactured by Nippon Aerosil Co, Ltd. Available examples of fine particles of zirconium oxide include Aerosil R976 and R811 (trade name) manufactured by Nippon Aerosil Co, Ltd.

Examples of preferable organic compounds are polymers including silicone resins, fluorine resins and acrylic resins. Among those, silicone resins are specifically preferable. Preferable available products of silicone resins have a three-dimensional net structure, and can be Tospearl 103, Tospearl 105, Tospearl 108, Tospearl 120, Tospearl 145, Tospearl 3120 and Tospearl 240 (trade name) manufactured by GE Toshiba Silicones Corp.

Fine particles preferable in the invention are silica and titanium oxide, and particularly silica. Fine particles can be contained at an amount equal to or more than 0.001 wt. % and equal to or less than 5 wt. % in 100 wt. % of polymer in the polymer film, and preferably, at an amount equal to or more than 0.1 wt. % and equal to or less than 3 wt. %, and desirably, at an amount equal to or more than 0.5 wt. % and equal to or less than 2 wt. %. If the amount of the fine particles is less than 0.001 wt. %, prevention of sticking between turns of wound polymer film will be insufficient. Should the amount of the fine particles be more than 5 wt. %, smoothness of the film surface will be too low.

Details of cellulose acylates are according to various relevant techniques. Those examples and their various features can be used in the present invention. Uses of various materials in relation to those have been suggested, including solvents, plasticizers, degradation retardants, ultraviolet (UV) absorbers, optical anisotropy control agents, dyes, matte agents, release agents, stripping accelerators, retardation control agents, and other additives.

I. Specific Examples of Cellulose Acylates

Suggested in JP A 57-182737 (corresponding to U.S. Pat. No. 4,499,043), JP A 10-45803 (corresponding to U.S. Pat. No. 5,856,468), JP A 11-269304 (corresponding to U.S. Pat. No. 6,139,785), JP A 8-231761, JP A 10-60170, JP A 9-40792, JP A 11-5851, JP A 9-90101, JP A 4-277530, JP A 11-292989, JP A 2000-131524, and JP A 2000-137115.

II. Specific Examples of Solvents for Esters and their Dissolution

Suggested in JP A 10-324774, JP A 8-152514, JP A 10-330538, JP A 9-95538, JP A 9-95557, JP A 10-235664, JP A 2000-63534, JP A 11-21379, JP A 10-182853, JP A 10-278056, JP A 10-279702, JP A 10-323853, JP A 10-237186, JP A 11-60807, JP A 11-152342, JP A 11-292988, JP A 11-60752, JP A 2000-95876, and JP A 2000-95877.

III. Plasticizers

Suggested in JP A 4-227941, JP A 5-194788, JP A 60-250053, JP A 6-16869, JP A 5-271471, JP A 7-286068, JP A 5-5047, JP A 11-80381, JP A 7-20317, JP A 8-57879, JP A 10-152568, and JP A 10-120824.

IV. Degradation Retardants and UV Absorbers

Suggested in JP A 60-235852, JP A 3-199201, JP A 5-190707, JP A 5-194789, JP A 5-197073, JP A 5-271471, JP A 6-107854, JP A 6-118233, JP A 6-148430, JP A 7-11055, JP A 7-11056, JP A 8-29619, JP A 8-239509 (corresponding to U.S. Pat. No. 5,806,834), JP A 2000-204173, and JP A 2000-193821.

[Production of Dope]

A dope is produced at first from the above substances. A solvent tank or reservoir stores solvent, with which a dissolving tank or reservoir is supplied. A hopper stores TAC, which is delivered into the dissolving tank at an amount measured in a monitored manner. An additive tank or reservoir stores an additive, to pour solution of the additive to the dissolving tank. Note that it is possible to deliver an additive to the dissolving tank in a normally liquid phase at a room temperature, unlike the phase of the solution of the solid additive in a solvent. Furthermore, if an additive is solid at a room temperature, the additive can be delivered to the dissolving tank by use of a hopper for the solid additive. Also, a multi conduit delivery can be used, in which a plurality of additive reservoirs are used for storing solutions of additives in solvents, and plural conduits are connected for delivery of the additive solutions to the dissolving tank.

According to the above description, the process of delivery to the dissolving tank or reservoir is in a sequence of solvent or mixed solvent, and TAC, and then additives. However, the process can be according to a sequence different from this. It is possible to pour solvent of a preferred amount after measuring and delivering the TAC to the dissolving tank. Furthermore, additives may not be prepared in the dissolving tank initially. It is possible in subsequent steps to mix additives to a composition containing TAC and solvent. Note that this composition can be also referred to as dope.

A jacket is disposed about the dissolving tank or reservoir. The dissolving tank is provided with a first stirring blade or anchor stirrer, which a motor drives for rotations. Preferably, a second stirring blade or dissolver stirrer of an eccentric form is used, which a motor drives for rotations. The anchor stirrer and the dissolver stirrer may be replaced by any suitable type of stirring blade. Heat exchange medium is preferably caused to flow between the dissolving tank and the jacket, to condition the dissolving tank thermally in a range from −10 to 55 deg. C. A swollen liquid can be obtained by selectively driving the anchor stirrer and the dissolver stirrer, the swollen liquid containing the solvent and the TAC swollen in the solvent.

The swollen liquid is delivered by a pump to a heater. It is preferable that conduits with a jacket are incorporated in the heater. Also, a structure for pressurizing the swollen liquid is associated with the heater. A dope is obtained by use of the swollen liquid conditioned in application of heat or application of pressure and heat, and by dissolving solid solute in a solvent. This is referred to as a process of heating dissolution. During the dissolution, the swollen liquid should be kept at a temperature of 50-120 deg. C. Also, a process of cooling dissolution can be used, in which the swollen liquid is cooled at a temperature between −100 and −30 deg. C. The TAC can be dissolved in the solvent sufficiently by suitable selection of the thermal dissolution and cooling dissolution. A temperature adjuster conditions the dope at the room temperature. A filtration device filtrates the dope to eliminate impurity. In the filtration device, a filter has a preferable pore diameter of which an average is 100 microns or less. A filtration flow rate is preferably 50 liters/hr or more. A polymer film producing system 20 is illustrated in FIG. 1. Dope 22 is filtrated, before a storing tank or reservoir 21 is provided with the dope 22.

For solution casting, however, dissolution of the TAC after preparing the swollen liquid causes a problem in long time typically required for high target density of the TAC, and a problem of high cost. In view of this, a dope of a low density can be preferably prepared at first in comparison with the target density, before condensation is made for preparing the dope at the higher target density. A flushing machine is supplied with the dope filtrated by the filtration device. Part of the solvent in the dope is evaporated in the flushing machine. A solvent recovery device is connected with the flushing machine. The solvent in the gas phase is liquefied by a condenser (not shown), and collected by the solvent recovery device. A solvent regenerator is supplied with the collected solvent, and regenerates a solvent ready for use in preparing the dope. The use of the solvent regenerator is effective in reducing the manufacturing cost.

After the condensation, a pump is used to remove the dope 22 from the flushing machine. Also, bubbles can be preferably eliminated from the dope. Any known defoaming methods can be used for removing bubbles, for example, ultrasonic defoaming. After this, a filtration device is supplied with the dope 22, and removes particles or other foreign materials from the dope 22. In the filtration device, the temperature of the dope 22 can be preferably kept at a level within a range of 0-200 deg. C. Then the dope 22 is poured and stored into the storing tank or reservoir 21.

According to the above embodiment, a dope containing TAC at a density of 5-40 wt. % is obtained. A dope, namely raw material dope, is stored in the tank. A density of the TAC in the dope is preferably equal to or more than 15 wt. % and equal to or less than 30 wt. %, and desirably equal to or more than 17 wt. % and equal to or less than 25 wt. %. A density of the additive, of which a main content is a plasticizer, in the dope is preferably equal to or more than 1 wt. % and equal to or less than 20 wt. % in 100 wt. % of the solid content in the dope. In a solution casting process to produce a cellulose ester film, various techniques of dissolution of materials and additives, filtration, elimination of bubbles, mixing of additives can be used. The features can be combined with the present invention. Details of those are according to various techniques.

No. 1. Dissolution Related to Casting

Suggested in JP A 9-95544 (corresponding to U.S. Pat. No. 5,663,310), JP A 10-45950, JP A 10-95854 (corresponding to U.S. Pat. No. 5,783,121), and JP A 2000-53784.

No. 2. Specific Preparing Methods of Solutions

Suggested in JP A 11-310640 (corresponding to U.S. Pat. No. 6,211,358), JP A 11-323017, JP A 11-302388, and JP A 2000-273184.

No. 3. Condensation of Solutions

Suggested in JP A 4-259511; U.S. Pat. Nos. 2,541,012, 2,858,229, 4,414,341, and 4,504,355.

[Solution Casting]

In FIG. 1, the polymer film producing system 20 is illustrated. The invention is not limited to the disclosed construction of FIG. 1. The polymer film producing system 20 includes the storing tank or reservoir 21, a filtration device 30, a casting die 31, a casting support band 34, and a tenter type of drier 35. There are rotatable rolls 32 and 33 between which the casting support band 34 extends. Also, various elements are installed, including a web edge slitter 40, a drying chamber 41, a cooling chamber 42, and a winding chamber 43.

A stirrer 61 is installed in the storing tank or reservoir 21. A motor 60 rotates the stirrer 61. A gear pump 62 and the filtration device 30 are connected between the storing tank 21 and the casting die 31.

Preferable materials of the casting die 31 can be stainless steel of a type of precipitation hardening. The material can have a coefficient of thermal expansion of $2 \times 10^{-5}$ (/deg. C.) or less. Desirably, a corrosion resistance of the material should be equal to that of SUS 316 steel according to forced corrosion test in electrolytic aqueous solution. Also, the material of the casting die 31 has the corrosion resistance sufficient for prevention of pitting on the gas-liquid interface even after dipping in a liquid mixture of dichloromethane, methanol and water for three (3) months. The casting die 31 is created by cutting and scraping a steel block which has been preserved for one (1) month or more after being molded. This preservation before the scraping is effective in regularizing a surface condition of the dope 22 flowing in the casting die 31. Surfaces of the casting die 31 to contact the liquid are formed with precision to have a surface roughness of 1 micron or less, and a degree of straightness of 1 micron per meter or less in any direction. A clearance of the die slot is adjustable in a range of 0.5-3.5 mm by an automated structure. Preferable corner portions at the end of the die lip to contact the liquid are shaped so as to set a radius of curvature R at 50 microns or less in the whole width of the slot. A preferable shear rate inside the die is in a range of 1-5,000 (1/sec).

A die width of the casting die 31 may not be limited to a certain size. A preferable die width of the casting die 31 can be 1.1-2.0 times as much as a web width of the polymer film as a final product. A temperature adjuster is preferably used in the course of casting in order to maintain a predetermined temperature. The casting die 31 is preferably a coat hanger type. Thickness adjusting die bolts or heat bolts can be arranged at a given pitch, and are preferably adapted to automatic adjustment of the thickness. The die bolts are constructed to set up a specific profile according to a flow amount of the gear pump 62 of a high precision by a stored program. Also, an infrared thickness meter (not shown) can be installed in the polymer film producing system 20, for feedback control according to an adjusting program based on the specific profile of the infrared thickness meter. A difference between any two points which are on the polymer film, except for the die edges for the casting, is preferably equal to or less than 1 micron. The greatest difference between minimum and maximum values of the thickness in the width direction is preferably set equal to or less than 3 microns, and desirably set equal to or less than 2 microns. Precision in the thickness is preferably so determined that an average error in the thickness of the cast film is equal to or less than 1.5 microns.

A hardened layer or case can be preferably formed on the end of the lip of the casting die 31. Various methods for forming the hardened layer or case can be used, including application of a ceramic coating, a hard chromium plating, and processing of nitriding. In case of using the ceramic coating, the material of the ceramic coating should have suitability for grinding, low porosity, low fragility, high resistance to corrosion, suitability for adhesion to the casting die 31, and property free from adhesion to the dope 22. Specifically, WC (tungsten carbide), $Al_2O_3$, TiN, $Cr_2O_3$ and the like can be used, among which WC is particularly preferable. A thermal spray process can be used for applying a WC coating.

Specifically, a solvent delivery device (not shown) can be connected to an end of the die slot of the casting die 31 for the purpose of preventing drying and local solidification of dope at the end of the die slot. A solvent for imparting solubility to the dope can be supplied to a gas-liquid-solid interface between an end of the casting bead, the die slot, and ambient gas. An example of the solvent can be a mixed solvent containing 86.5 parts by weight of dichloromethane, 13 parts by weight of acetone, and 0.5 part by weight of n-butanol. The mixed solvent should be delivered to each of two slot ends at a range of 0.1-1.0 ml/min for the purpose of preventing existence of foreign materials in the cast film. A pump for delivering the mixed solvent should have a fluctuation ratio of 5% or lower.

Between the rotatable rolls 32 and 33, the casting support band 34 extends for turning under the casting die 31. The casting support band 34 circulates endlessly by rotations of the rotatable rolls 32 and 33, which a drive device (not shown) drives. A preferable range of a casting speed, namely a moving speed of the casting support band 34 is 10-200 m/min. A heat exchange medium circulator 63 should be preferably associated with the rotatable rolls 32 and 33 for controlling a surface temperature of the casting support band 34. A preferable adjustable range of the surface temperature of the casting support band 34 is from −20 to 40 deg. C. A flow conduit for a heat exchange medium is formed through the rotatable rolls 32 and 33, and keeps the rotatable rolls 32 and 33 at a target temperature by flow of the heat exchange medium at a prescribed temperature.

A width of the casting support band 34 may not be limited to a certain size. A preferable width of the casting support band 34 can be preferably 1.1-2.0 times as much as a casting width of the dope 22. A length of the casting support band 34 is preferably 20-200 meters. A thickness of the casting support band 34 is 0.5-2.5 mm. A surface roughness of the casting support band 34 is 0.05 micron or less owing to polishing the band surface. The material of the casting support band 34 is preferably stainless steel, for example SUS 316, and has sufficient strength and resistance to corrosion. Irregularity of the thickness of the casting support band 34 is preferably 0.5% or less.

The rotatable rolls 32 and 33 can be a drum-shaped support for casting in place of the casting support band 34. It is preferable to rotate the rotatable rolls 32 and 33 with such high precision that fluctuation of rotations is as small as 0.2 mm or lower. An average surface roughness of the rotatable rolls 32 and 33 can be 0.01 micron or less. Thus, the rotatable rolls 32 and 33 are finished by chrome plating or the like for imparting sufficient hardiness and durability. It is necessary to minimize the surface defects of the support which may be the casting support band 34 or the rotatable rolls 32 and 33. Specifically, an amount of a pinhole in a size of 30 microns or more should be zero. An amount of a pinhole in a size equal to or more than 10 microns and less than 30 microns should be one (1) or less per sq. meter. An amount of a pinhole in a size less than 10 microns should be two (2) or less per sq. meter.

A casting chamber 64 is installed to accommodate the casting die 31 and the casting support band 34. A temperature adjuster 65 maintains the temperature inside the casting chamber 64 at a prescribed level. A condenser 66 is provided and condenses and collects the solvent from the content in the gas phase. A solvent recovery device 67 outside the casting chamber 64 collects and recovers the condensed solvent in the liquid phase. There is a decompressing chamber 68 located on the rear surface of the casting bead for stabilizing the forming of the casting bead, to regulate the pressure at a predetermined level.

A cast film 69 still contains the solvent in the liquid phase. Vents 70, 71 and 72 are preferably disposed near to the surface of the casting support band 34, for evaporating solvent in the cast film 69 by blowing air or other gas. A cooler 73 is disposed near to a position of stripping the cast film 69, and cools the cast film 69. A thermometer 74 is associated with the rotatable roll 33 for measuring a surface temperature of the rotatable roll 33. A gas blocking panel 75 is disposed with the vent 70 near to the casting die 31, for blocking excessive flow of dry gas, in order to suppress changes in the quality of the film surface in blowing of dry gas to the cast film 69.

A transition assembly 80 transfers a polymer film 82. A blowing machine 81 is associated with the transition assembly 80. A film grinder or crusher 90 is disposed on the web edge slitter 40 at a downstream end of the tenter type of drier 35. Pieces of web edge portions, which are obtained from the polymer film 82, are ground by the film grinder or crusher 90 into polymer film chips.

A number of transport rolls 91 are contained in the drying chamber 41. Also, an adsorption solvent recovery device 92 is contained in the drying chamber 41, and adsorbs and collects the gasified content of the solvent. Note that, in FIG. 1, a humidity conditioning chamber (not shown) is installed between the drying chamber 41 and the cooling chamber 42 instead of positioning the cooling chamber 42 directly next to the drying chamber 41. An electrostatic elimination bar 93 is installed for keeping a potential of the polymer film 82 being electrified in a predetermined range, for example from −3 kV to +3 kV. In the embodiment, the electrostatic elimination bar 93 in FIG. 1 is disposed downstream from the cooling chamber 42, but may be positioned in a modified manner. Furthermore, a knurling roll 94 is preferably used downstream from the electrostatic elimination bar 93, to knurl web edge portions of the polymer film 82 by embossing. A winding roll 95 and a press roll 96 are positioned inside the winding chamber 43. The winding roll 95 winds the polymer film 82. The press roll 96 adjusts tension applied to the polymer film 82 in the course of the winding.

One process of producing the polymer film 82 by use of the polymer film producing system 20 above is hereinafter described. The stirrer 61 rotates and stirs the dope 22, to keep uniformity of the dope 22. During the stirring, various additives may be added to the dope 22, including a stripping accelerator, plasticizer, ultraviolet (UV) absorber, fine particles and the like.

The dope 22 is delivered by the gear pump 62 to the filtration device 30 and filtrated, and then cast by the casting die 31 on to the casting support band 34. Tension which occurs in the casting support band 34 in rotation of the rotatable rolls 32 and 33 for driving should be controlled and regulated at a level from $10^4$ N/m to $10^5$ N/m. A difference in the speed between the casting support band 34 and the rotatable rolls 32 and 33 can be regulated at 0.01 m/min or less. A fluctuation in the speed of the casting support band 34 can be kept 0.5% or less. A zigzag movement of the casting support band 34 in the band width direction can be limited to 1.5 mm or less during one turn of the casting support band 34. To control the zigzag movement, an edge detector (not shown) for detecting band edges of the casting support band 34 can be used, for the purpose of feedback control according to measured information of the detection. Also, an under-die portion of the casting support band 34 directly under the casting die 31 can be kept from moving beyond a range of 200 microns in a vertical direction while the rotatable roll 33 rotates. The atmosphere in the casting chamber 64 can be preferably adjusted so that a dew point in the vicinity of the stripping position for the cast film is 0 (zero) deg. C. or lower by the temperature adjuster 65 or by conditioning of humidity. Thus, condensation of dew is suppressed in the stripping position so as to keep a surface quality of the polymer film 82 high without a drop. Also, temperature of the inside of the casting chamber 64 can be set in a preferable range from −10 to 57 deg. C.

Gaseous solvent created inside the casting chamber 64 is collected by the solvent recovery device 67, which regenerates the condensed solvent in the liquid phase, and delivers the solvent for preparing dope.

The dope 22 is cast by the casting die 31 on to the casting support band 34 in forming a casting bead downwards. So the cast film 69 is formed. Temperature of the dope 22 is preferably from −10 to 57 deg. C. The decompressing chamber 68 is located on the rear surface of the casting bead for stabilizing the forming of the casting bead, to regulate the pressure at a predetermined level. A rear surface of the bead can be decompressed with a pressure difference from −2,000 Pa to −10 Pa in comparison with a pressure to the bead front surface. Also, a jacket (not shown) is preferably secured to keep the decompressing chamber 68 at a prescribed temperature. A preferable temperature of the decompressing chamber 68 can be equal to or higher than a condensation point of the organic solvent in use. Also, a suction device (not shown) is associated with the edge portion of the casting die 31 for shaping the casting bead in an intended form. A flow rate of the suction of gas on the edge is preferably 1-100 liters per minute.

While the casting support band 34 turns, the cast film 69 moves and is blown by dry gas from the vents 70, 71 and 72, to quicken evaporation of the solvent. The cooler 73 suppresses possible modification of surface quality of the cast film 69, and protects the surface quality from the blow of the dry gas. A surface temperature of the casting support band 34 can be in a range from −20 to 40 deg. C.

When the cast film 69 further travels, the cooler 73 blows cool gas to the cast film 69 for cooling. The cast film 69 being cooled becomes gelled, and can be prevented from failure in the stripping because of an increase in the mechanical strength of the cast film 69. A cooling temperature for the cast film 69 is lower than 6 deg. C., preferably equal to or lower than 5 deg. C., and specifically preferably equal to or lower than 4 deg. C. There is no particular lower limit of the cooling temperature. However, the cooling temperature for the cast film 69 is preferably equal to or higher than −30 deg. C. in consideration of practically cooling performance of the cooler 73.

The cooler 73 cools the cast film 69 within a predetermined cooling region, which can be preferably started at the stripping point A for the cast film 69, extend upstream therefrom, and has a length equal to or less than 25% of the length of the casting support band 34. However, should the cooling region have a length more than 25%, volatilization of the solvent in the cast film 69 will be insufficient. A lower limit of the length of the cooling region can be determined suitably. Preferably, the cooling region can have a length equal to or more than 5% of the length of the casting support band 34 for the purpose of ensured gelling of the cast film 69 to raise a mechanical strength. Note that the position of the cooler 73, which is opposed to the cast film 69 in the drawing, is not limited particularly according to the invention. The cooler 73 can be also disposed on a back surface of the casting support band 34 opposite to the cast film 69. Cool gas flowing from the cooler 73 may cool the cast film 69 in passing by the casting support band 34.

A surface temperature of the rotatable roll 33 is measured by the thermometer 74. The surface temperature can be preferably equal to or more than −30 deg. C. and equal to or less than 6 deg. C. If the surface temperature is less than −30 deg. C., condensation of dew is likely to occur to lower a surface quality of the cast film 69. Should the surface temperature is more than 6 deg. C., optical performance of the polymer film will be lower because of heat.

A self-supporting cast film 76 is obtained from the cast film 69 as a result. A stripping roll 77 supports and strips the self-supporting cast film 76 from the casting support band 34. At the time of stripping, the ratio of residual solvent according to the dry base can be preferably equal to or more than 50 wt. % and equal to or less than 250 wt. %. If the ratio of residual solvent is less than 50 wt. %, breakage, failure or other damage is likely to occur due to a drop in the flexibility of the self-supporting cast film 76. Should the ratio of residual solvent is more than 250 wt. %, mechanical strength of the self-supporting cast film 76 will be lower, to cause failure in the transport. Longer time may be required in the succeeding drying step, to lower productivity.

Then the self-supporting cast film 76 is transported through the transition assembly 80 having a plurality of rolls, and moved to the tenter type of drier 35. In the transition assembly 80, the blowing machine 81 blows dry gas at an intended temperature, to quicken drying of the self-supporting cast film 76. It is preferable that the temperature of the dry gas is 20-250 deg. C. It is also possible in the transition assembly 80 to rotate one or more specific rolls faster than rolls that are upstream from the specific rolls, for the purpose of stretching the self-supporting cast film 76 with tension in the casting direction.

The self-supporting cast film 76 is fed and dried in the tenter type of drier 35 while its web edges are retained by tenter clips. It is possible to define plural temperature zones in the tenter type of drier 35 for conditioning the drying operation by plural temperatures different from one another. Also, the self-supporting cast film 76 can be stretched and loosened by the tenter type of drier 35 in the web width direction of the self-supporting cast film 76. Also, it is possible in at least one of the transition assembly 80 and the tenter type of drier 35 to stretch the self-supporting cast film 76 at a ratio of 0.5-300% in at least one of the casting direction and the web width direction.

The self-supporting cast film 76 is dried by the tenter type of drier 35 to an extent with a predetermined amount of the residual solvent, so the polymer film 82 is delivered by the tenter type of drier 35. The web edge slitter 40 slits away two web edge portions from the polymer film 82. A cutter blower (not shown) blows gas to the web edge portions, which are introduced to the film grinder or crusher 90. The web edge portions are ground by the film grinder or crusher 90 into polymer film chips. It is effective in view of low manufacturing cost to reuse the chips for preparing and regenerating dope. Note that the slitting step of the web edge portions may be omitted from the casting process. However, the slitting step can be preferably added at any suitable location within the sequence starting at the casting step and ending at the polymer film winding step.

After the web edges are slitted away, the polymer film 82 is transported into the drying chamber 41. An inner temperature of the drying chamber 41 is preferably in a range of 50-160 deg. C. The polymer film 82 is transported in contact with the transport rolls 91 in the drying chamber 41, and is dried by gasification of the solvent. In the drying chamber 41, the gasified content of the solvent is adsorbed and collected by the adsorption solvent recovery device 92. Atmosphere after removal of the solvent content is caused again to flow into the drying chamber 41 as dry gas. There are preferably plural zones defined in the drying chamber 41. Temperature of dry gas for those zones is conditioned at different drying temperatures. A pre-drying chamber (not shown) is also located between the web edge slitter 40 and the drying chamber 41, for drying the polymer film 82 in a preliminary manner. This is effective in suppressing changes in the shape of the polymer film 82 owing to preventing abrupt rise in the film surface temperature.

The polymer film 82 is cooled by the cooling chamber 42 substantially down to the room temperature. Note that a humidity adjusting chamber (not shown) can be installed between the drying chamber 41 and the cooling chamber 42, so as to blow conditioning gas to the polymer film 82, the conditioning gas having humidity and temperature determined in compliance to requirements. This is effective in suppressing occurrence of curls in the polymer film 82, and occurrence in failure in the winding.

The electrostatic elimination bar 93 is installed for keeping a potential of the polymer film 82 being electrified in a predetermined range, for example from −3 kV to +3 kV. The electrostatic elimination bar 93 in FIG. 1 is disposed downstream from the cooling chamber 42, but may be positioned in a modified manner. Furthermore, the knurling roll 94 is preferably used to knurl web edge portions of the polymer film 82 by embossing. The knurling of the knurling roll 94 can be preferably conditioned to create a knurled pattern with a size of 1-200 microns in the thickness direction.

Finally, the winding roll 95 in the winding chamber 43 winds the polymer film 82. It is preferable to use the press roll 96 to apply tension of a prescribed level to the rolled film. Also, the tension can be changed gradually from the start until the end of the winding. A web length of the polymer film 82 is equal to or more than 100 meters in the casting direction. The polymer film 82 has a width of 600 mm or more, preferably has a width equal to or more than 1,400 mm and equal to or less than 1,800 mm. The feature of the invention is effective also if the width is over 1,800 mm. The thickness of the polymer film may be very small according to the invention, for example a thickness equal to or more than 15 microns and equal to or less than 100 microns.

Figure 2:
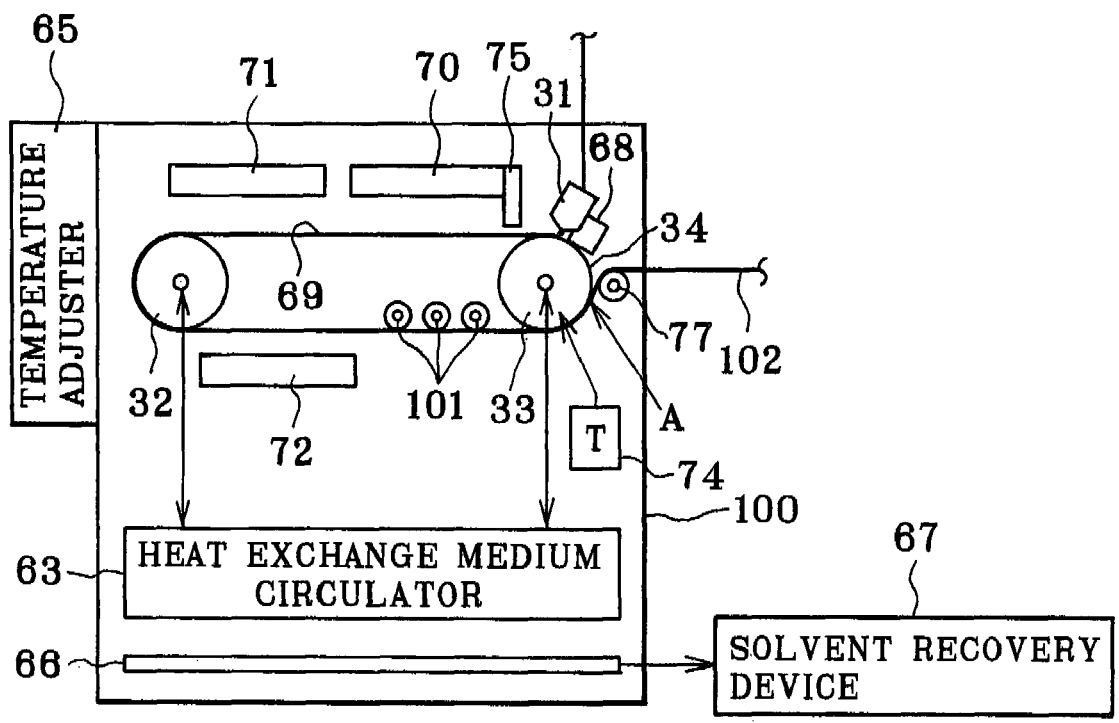
FIG. 2 is an explanatory view illustrating another preferred embodiment including cooling rolls.

In FIG. 2, another preferred polymer film producing system is illustrated. Elements similar to those in FIG. 1 are designated with identical reference numerals. A casting chamber 100 contains the casting support band 34. Cooling rolls or chill rolls 101 are disposed from the stripping position A and arranged in an upstream direction. The cooling rolls 101 are disposed to oppose to a back surface of the casting support band 34 reverse to its surface in contact with the cast film 69, to prevent drop in the surface quality of the cast film 69. The number of the cooling rolls 101 or an associated cooling structure can be modified suitably. A preferable number of the cooling rolls 101 is equal to or more than three (3) and equal to or less than 20.

A structure for cooling is not limited in particular. For example, a flow conduit for a heat exchange medium of a low temperature is formed through the cooling rolls or chill rolls 101 to cool the cast film 69 by contact. Alternatively, it is possible to associate a Peltier device with the cooling rolls 101 for cooling. Remaining portions of the condition are the same as those related to FIG. 1. The cast film 69 is cooled by the cooling rolls 101 down to a predetermined temperature, and supported and stripped by the stripping roll 77. So a self-supporting cast film 102 is obtained, and subjected to the drying process and the like.

In the solution casting of the invention, the dopes, namely two or more dopes, can be cast according to simultaneous multi casting or successive multi casting. Also, those two methods of casting can be combined with one another. For the simultaneous multi casting, it is possible to use any one of a casting die with a feed block, and a multi-manifold casting die. The thickness of one of the cast films disposed on the air surface side, and/or another of them disposed on the casting support side, is preferably 0.5-30% of the total thickness of the cast films. Also, it is preferable in the course of the simultaneous multi casting to wrap part of high-viscosity dope with part of low-viscosity dope among the dopes. Also, it is preferable in the course of the simultaneous multi casting to wrap part of a first selected dope with part of a second selected dope among the dopes, the first selected dope containing a higher amount of alcohol than that of the second selected dope.

Figure 3:
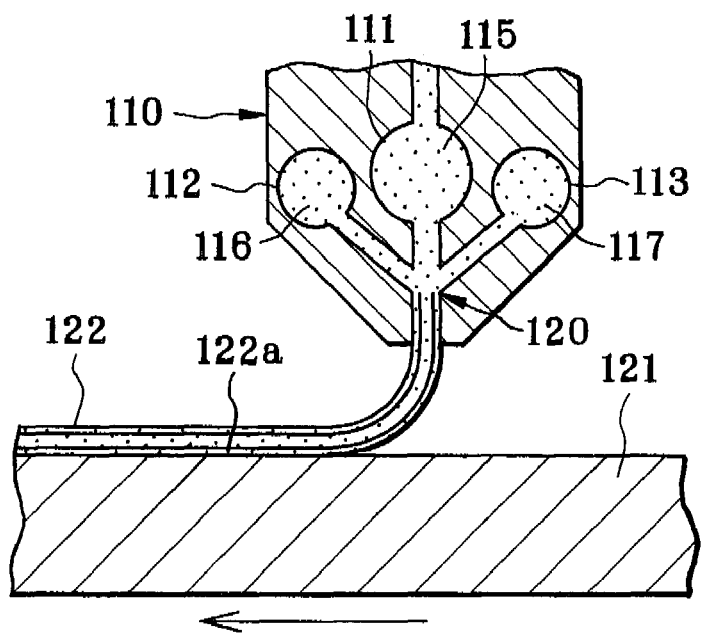
FIG. 3 is an explanatory view in section, illustrating another preferred casting die for multi casting.

In FIG. 3, another preferred embodiment is illustrated, in which a multi manifold casting die 110 is used for multi casting. Three manifolds 111, 112 and 113 are incorporated in the multi manifold casting die 110. A core layer dope 115 flows into the manifold 111. An air surface dope 116 flows in the manifold 112. A support surface dope 117 flows in the manifold 113. Among the plural dopes 115-117, at least the support surface dope 117 is constituted by fluid which contains stripping accelerator. A collector 120 is positioned within the multi manifold casting die 110, for collecting flows of the plural dopes 115-117. A casting support band 121 receives bead of the collected dope, so a cast film 122 is formed by the casting support band 121. Among three layers in the cast film 122, at least a support surface layer 122a is constituted by fluid which contains stripping accelerator, which facilitates stripping of the cast film 122 from the casting support band 121. This is followed by the process in the production in the same form as the above embodiment.

Various methods are usable in combination to the casting of the invention, the methods including construction of the casting die, decompression chamber, support and other mechanical elements, conditioning for drying in sequential steps including the multi casting, stripping, stretching and the like, polymer film handling, winding after eliminating a curl for flatness, solvent collection, polymer film collection. Those can be used in the present invention.

A. Support of Metal for Solution Casting

Suggested in JP A 2000-84960; U.S. Pat. Nos. 2,336,310, 2,367,603, 2,492,078, 2,492,977, 2,492,978, 2,607,704, 2,739,069, 2,739,070, GB A 640731 (corresponding to U.S. Pat. No. 2,492,977), GB A 735892; JP B 45-4554, JP B 49-5614, JP A 60-176834, JP A 60-203430, and JP A 62-115035.

B. Multi Casting

Suggested in JP B 62-43846; JP A 61-158414, JP A 1-122419, JP B 60-27562, JP A 61-94724, JP A 61-947245, JP A 61-104813, JP A 61-158413, JP A 6-134933; JP A 56-162617; JP A 61-94724, JP A 61-94725, and JP A 11-198285.

C. Specific Methods of Casting of Cellulose Esters

Suggested in JP A 61-94724, JP A 61-148013, JP A 4-85011 (corresponding to U.S. Pat. No. 5,188,788), JP A 4-286611, JP A 5-185443, JP A 5-185445, JP A 6-278149, and JP A 8-207210.

D. Stretching

Suggested in JP A 62-115035, JP A 4-152125, JP A 4-284211, JP A 4-298310, and JP A 11-48271.

E. Specific Methods of Drying

Suggested in JP A 8-134336, JP A 8-259706, and JP A 8-325388.

F. Drying of Specific Controls of Heat

Suggested in JP A 04-001009, JP A 62-046626, JP A 04-286611, and JP A 2000-002809.

G. Drying in Preventing Wrinkles

Suggested in JP A 11-123732, JP A 11-138568, and JP A 2000-176950.

[Curls, Thickness and their Measurement]

Curls, thickness and their measurement of the wound cellulose acylate film are suggested in known documents. These can be used in the present invention

[Surface Processing]

At least one of the two surfaces of the cellulose ester film is preferably processed by surface processing. Examples of the surface processing include vacuum glow discharge processing, atmospheric pressure plasma discharge processing, ultraviolet radiation applying processing, corona discharge processing, flame processing, acid processing, alkali processing and the like.

[Functioning Layers]

Also, at least one of the two surfaces of the cellulose ester film can be coated with an undercoat. Various types of the undercoat can be used.

A polymer as a final product can preferably be a functioning material including the polymer film as base, and at least one other functioning layer. Examples of functioning layers include an antistatic layer, a hard resin layer, anti reflection layer, attachment facilitating layer, anti-glare layer, optical compensation layer and the like.

At least one surface active agent can be preferably included in the functioning layers in a range of 0.1-1,000 mg per sq. meter. At least one smoothing agent can be included in the functioning layers in a range of 0.1-1,000 mg per sq. meter. At least one matte agent can be included in the functioning layers in a range of 0.1-1,000 mg per sq. meter. Further, at least one antistatic agent can be included in the functioning layers in a range of 1-1,000 mg per sq. meter. Methods of adding the surface processed functioning layers to the cellulose ester film, and their various conditions are according to suggested techniques. Those can be used in the present invention.

I. Plasma Processing in General

Suggested in JP A 6-123062, JP A 11-5857, and JP A 11-293011.

II. Specific Methods of Plasma Processing

Suggested in JP A 2003-161807, JP A 2003-166063, JP A 2003-171770, JP A 2003-183836, JP A 2003-201568, and JP A 2003-201570.

III. Glow Discharge Processing

Suggested in U.S. Pat. Nos. 3,462,335, 3,761,299, 4,072,769, GB A 891469; JP A 59-556430; and JP B 60-16614.

IV. Ultraviolet Processing

Suggested in JP B 43-2603, JP B 43-2604, and JP B 45-3828.

V. Corona Discharge Processing

Suggested in JP B 39-12838, JP A 47-19824, JP A 48-28067, and JP A 52-42114.

VI. Matte Agents for Undercoats

Suggested in U.S. Pat. Nos. 4,142,894, and 4,396,706.

VII. Lubricants

Suggested in JP B 53-292, U.S. Pat. Nos. 3,933,516, 4,275,146; JP B 58-33541, GB A 927446 (corresponding to U.S. Pat. No. 3,121,060); JP A 55-126238, JP A 58-90633; JP A 58-50534; and European Patent Application 90108115 (corresponding to U.S. Pat. No. 5,063,147).

VIII. Polyorganosiloxanes as Lubricants

Suggested in JP B 53-292, JP B 55-49294, and JP A 60-140341.

IX. Antistatic Agents of Ionic Macromolecular Types

Suggested in JP B 49-23827, JP B 49-23828, JP B 47-28937; JP B 55-734, JP A 50-54672, JP B 59-14735, JP B 57-18175, JP B 57-18176, JP B 57-56059; JP B 53-13223, JP B 57-15376, JP B 53-45231, JP B 55-145783, JP B 55-65950, JP B 55-67746, JP B 57-11342, JP B 57-19735, JP B 58-56858, JP A 61-27853, and JP B 62-9346.

X. Polymer Films Coatable with Hard Coat Layers

Suggested in JP A 6-123806, JP A 9-113728, and JP A 9-203810.

XI. Photopolymerizable Compounds

Suggested in JP A 50-151996, JP A 50-158680; JP A 50-151997 (corresponding to U.S. Pat. No. 4,058,401), JP A 52-30899 (corresponding to U.S. Pat. No. 4,256,828), JP A 55-125105; JP A 56-8428 (corresponding to U.S. Pat. No. 4,299,938), JP A 56-55420 (corresponding to U.S. Pat. No. 4,374,066), JP A 56-149402 (corresponding to U.S. Pat. No. 4,339,567), JP A 57-192429 (corresponding to U.S. Pat. No. 4,387,216); JP B 49-17040; and U.S. Pat. No. 4,139,655.

XII. Coatings for Preventing Reflection

Suggested in JP A 7-126552, JP A 7-188582, JP A 8-48935, JP A 8-100136, JP A 9-220791, and JP A 9-272169.

[Uses]

The above-described cellulose acylate film is useful particularly as a polarizer protecting film. A flat polarizer is obtained by attachment of cellulose acylate films. Two polarizers are attached to liquid crystal layers to create a liquid crystal display panel. Note that the order of the layers or films may be modified. Various examples of liquid crystal display panels are known, including TN type, STN type, VA type, OCB type, reflection type and the like. Any of those can be used in the present invention. The prior art also suggests cellulose acylate film including an optical anisotropic layer, and cellulose acylate film with an anti-reflection property or antiglare property. Also, the use of biaxial cellulose acylate film as optical compensation film is disclosed with suitable optical characteristics. Furthermore, cellulose acylate film can be used both for the optical compensation film and the polarizer protecting film. The features can be combined with the present invention. Details of those are according to various suggested techniques.

No. 1. Cellulose Ester Protective Films for Polarizers

Suggested in JP A 09-113727, JP A 10-095861, and JP A 10-095862.

No. 2. Uses of Cellulose Ester Films as High Performance Optical Elements

Suggested in JP A 11-254466, JP A 2000-284124, and JP A 2000-284123.

No. 3. Production of Cellulose Ester Films as High Performance Optical Elements

Suggested in JP A 06-130226, JP A 06-235819, JP A 2000-131523, JP A 2000-212298, and JP A 2000-204173.

No. 4. Optical Compensation Sheets

Suggested in JP A 3-9325, JP A 6-148429, JP A 8-50206, and JP A 9-26572.

No. 5. TN Type of LCD Panels

Suggested in JP A 3-9325 (corresponding to U.S. Pat. No. 5,132,147), JP A 6-148429, JP A 8-50206 (corresponding to U.S. Pat. No. 5,583,679), and JP A 9-26572 (corresponding to U.S. Pat. No. 5,855,971).

No. 6. Reflection Type of LCD Panels

Suggested in JP A 10-123478, WO 9848320 (corresponding to U.S. Pat. No. 6,791,640), JP B 3022477 (corresponding to U.S. Pat. No. 6,433,845); and WO 00-65384.

No. 7. Discotic Compounds as Coating Cellulose Ester Films

Suggested in JP A 7-267902, JP A 7-281028, and JP A 7-306317.

No. 8. Characteristics of Optical Compensation Sheets

Suggested in JP A 8-5837, JP A 7-191217, JP A 7-281028, and JP A 8-50206.

No. 9. Production of Optical Compensation Sheets

Suggested in JP A 8-160431, JP A 9-73016, and JP A 9-73081.

No. 10. Use of Cellulose Ester Films in LCD Panels

Suggested in JP A 8-95034, JP A 9-197397, and JP A 11-316378.

No. 11. LCD Elements of Guest-Host Reflection Types

Suggested in JP A 6-222350, JP A 8-36174, JP A 10-268300, JP A 10-292175, JP A 10-293301, JP A 10-311976, JP A 10-319442, JP A 10-325953, JP A 10-333138, and JP A 11-38410.

No. 12. Coating Methods

Suggested in U.S. Pat. Nos. 2,681,294; 2,761,791, 2,941,898, 3,508,947, and 3,526,528.

No. 13. Constructions of Overlaying Coatings

Suggested in JP A 8-122504, JP A 8-110401, JP A 10-206603, JP A 10-300902, JP A 2002-243906, JP A 2000-111706, and JP A 2002-243906.

No. 14. High Refractive Index Layer and Middle Refractive Index Layer

Suggested in U.S. Pat. No. 6,210,858, JP A 11-295503, JP A 11-153703, JP A 2000-9908; JP A 2001-310432; JP A 2001-166104; JP A 11-153703, JP A 2002-2776069; JP A 2000-47004, JP A 2001-315242, JP A 2001-31871, JP A 2001-296401; and JP A 2001-293818.

No. 15. Low Refractive Index Layer

Suggested in JP A 58-142958, JP A 58-147483, JP A 58-147484, JP A 9-222503, JP A 11-38202, JP A 2001-40284, JP A 2000-284102, JP A 11-258403, JP A 9-157582, JP A 11-106704, JP A 2000-117902, JP A 2001-48590, and JP A 2002-53804.

No. 16. Hard Coat Layer

Suggested in JP A 2000-9908, JP A 2002-144913, and WO 00/46617.

No. 17. Front Scattering Layer

Suggested in JP A 11-38208, JP A 2000-199809, and JP A 2002-107512.

No. 18. Antiglare Characteristic

Suggested in JP A 63-278839, JP A 11-183710, JP A 2000-271878, JP A 2000-281410, JP A 2000-95893, JP A 2001-100004, JP A 2001-281407, and JP A 2000-275401.

No. 19. Dichroic Compounds

Suggested in JP A 1-161202, JP A 1-172906, JP A 1-172907, JP A 1-183602, JP A 1-248105, JP A 1-265205, and JP A 7-261024 (corresponding to U.S. Pat. No. 5,706,131).

No. 20. Various Devices and Films for Optics

Suggested in JP A 5-19115, JP A 5-119216, JP A 5-162261, JP A 5-182518, JP A 5-196819, JP A 5-264811, JP A 5-281411, JP A 5-281417, JP A 5-281537, JP A 5-288921, JP A 5-288923, JP A 5-311119, JP A 5-339395, JP A 5-40204, JP A 5-45512, JP A 6-109922, JP A 6-123805, JP A 6-160626, JP A 6-214107, JP A 6-214108, JP A 6-214109, JP A 6-222209, JP A 6-222353, JP A 6-234175, JP A 6-235810, JP A 6-241397, JP A 6-258520, JP A 6-264030, JP A 6-305270, JP A 6-331826, JP A 6-347641, JP A 6-75110, JP A 6-75111, JP A 6-82779, JP A 6-93133, JP A 7-104126, JP A 7-134212, JP A 7-181322, JP A 7-188383, JP A 7-230086, JP A 7-290652, JP A 7-294903, JP A 7-294904, JP A 7-294905, JP A 7-325219, JP A 7-56014, JP A 7-56017, JP A 7-92321, JP A 8-122525, JP A 8-146220, JP A 8-171016, JP A 8-188661, JP A 8-21999, JP A 8-240712, JP A 8-25575, JP A 8-286179, JP A 8-292322, JP A 8-297211, JP A 8-304624, JP A 8-313881, JP A 8-43812, JP A 8-62419, JP A 8-62422, JP A 8-76112, JP A 8-94834, JP A 9-137143, JP A 9-197127, JP A 9-251110, JP A 9-258023, JP A 9-269413, JP A 9-269414, JP A 9-281483, JP A 9-288212, JP A 9-288213, JP A 9-292525, JP A 9-292526, JP A 9-294959, JP A 9-318817, JP A 9-80233, JP A 9-99515, JP A 10-10320, JP A 10-104428, JP A 10-111403, JP A 10-111507, JP A 10-123302, JP A 10-123322, JP A 10-123323, JP A 10-176118, JP A 10-186133, JP A 10-264322, JP A 10-268133, JP A 10-268134, JP A 10-319408, JP A 10-332933, JP A 10-39137, JP A 10-39140, JP A 10-68821, JP A 10-68824, JP A 10-90517, JP A 11-116903, JP A 11-181131, JP A 11-211901, JP A 11-211914, JP A 11-242119, JP A 11-246693, JP A 11-246694, JP A 11-256117, JP A 11-258425, JP A 11-263861, JP A 11-287902, JP A 11-295525; JP A 11-295527, JP A 11-302423, JP A 11-309830, JP A 11-323552, JP A 11-335641, JP A 11-344700, JP A 11-349947, JP A 11-95011, JP A 11-95030, JP A 11-95208, JP A 2000-109780. JP A 2000-110070, JP A 2000-119657, JP A 2000-141556, JP A 2000-147208, JP A 2000-17099, JP A 2000-171603, JP A 2000-171618, JP A 2000-180615, JP A 2000-187102, JP A 2000-187106, JP A 2000-191819, JP A 2000-191821, JP A 2000-193804, JP A 2000-204189, JP A 2000-206306, JP A 2000-214323, JP A 2000-214329, JP A 2000-230159, JP A 2000-235107, JP A 2000-241626, JP A 2000-250038, JP A 2000-267095, JP A 2000-284122, JP A 2000-292780, JP A 2000-292781, JP A 2000-304927, JP A 2000-304928, JP A 2000-304929, JP A 2000-309195, JP A 2000-309196, JP A 2000-309198, JP A 2000-309642, JP A 2000-310704, JP A 2000-310708, JP A 2000-310709, JP A 2000-310710, JP A 2000-310711, JP A 2000-310712, JP A 2000-310713, JP A 2000-310714, JP A 2000-310715, JP A 2000-310716, JP A 2000-310717, JP A 2000-321560, JP A 2000-321567, JP A 2000-329936, JP A 2000-329941, JP A 2000-338309, JP A 2000-338329, JP A 2000-344905, JP A 2000-347016, JP A 2000-347017, JP A 2000-347026, JP A 2000-347027, JP A 2000-347029, JP A 2000-347030, JP A 2000-347031, JP A 2000-347032, JP A 2000-347033, JP A 2000-347034, JP A 2000-347035, JP A 2000-347037, JP A 2000-347038, JP A 2000-86989, and JP A 2000-98392; and JP A 2001-4819, JP A 2001-4829, JP A 2001-4830, JP A 2001-4831, JP A 2001-4832, JP A 2001-4834, JP A 2001-4835, JP A 2001-4836, JP A 2001-4838, JP A 2001-4839, JP A 2001-100012, JP A 2001-108805, JP A 2001-108806, JP A 2001-133627, JP A 2001-133628, JP A 2001-142062, JP A 2001-142072, JP A 2001-174630, JP A 2001-174634, JP A 2001-174637, JP A 2001-179902, JP A 2001-183526, JP A 2001-183653, JP A 2001-188103, JP A 2001-188124, JP A 2001-188125, JP A 2001-188225, JP A 2001-188231, JP A 2001-194505, JP A 2001-228311, JP A 2001-228333, JP A 2001-242461, JP A 2001-242546, JP A 2001-247834, JP A 2001-26061, JP A 2001-264517, JP A 2001-272535, JP A 2001-278924, JP A 2001-2797, JP A 2001-287308, JP A 2001-305345, JP A 2001-311823, JP A 2001-311827, JP A 2001-350005, JP A 2001-356207, JP A 2001-356213, JP A 2001-42122, JP A 2001-42323, JP A 2001-42325, JP A 2001-51118, JP A 2001-51119, JP A 2001-51120, JP A 2001-51273, JP A 2001-51274, JP A 2001-55573, JP A 2001-66431, JP A 2001-66597, JP A 2001-74920, JP A 2001-81469, JP A 2001-83329, JP A 2001-83515, JP A 2001-91719, JP A 2002-162628, JP A 2002-169024, JP A 2002-189421, JP A 2002-201367, JP A 2002-20410, JP A 2002-258046, JP A 2002-275391, JP A 2002-294174, JP A 2002-311214, JP A 2002-311246, JP A 2002-328233, JP A 2002-

338703, JP A 2002-363266, JP A 2002-365164, JP A 2002-370303, JP A 2002-40209, JP A 2002-48917, JP A 2002-6109, JP A 2002-71950, JP A 2002-82222, JP A 2002-90528, JP A 2003-105540, JP A 2003-114331, JP A 2003-131036, JP A 2003-139952, JP A 2003-153353, JP A 2003-172819, JP A 2003-35819, JP A 2003-43252, JP A 2003-50318, and JP A 2003-96066.

It is possible in the invention to form cellulose triacetate (TAC) film having high optical performance. The TAC film can be used as a base film for a polarizing plate protecting film or photosensitive material. Also, the TAC film can be used as an optical compensation film for use with a liquid crystal display panel in a television set to compensate for dependency upon the viewing angle. Also, the TAC film can be effectively used as an element which is both of a polarizing plate and a protecting film simultaneously. A mode of the liquid crystal may be not only the TN mode but any one of the IPS mode, OCB mode and VA mode. Polarizing plates can be constructed by a polarizing plate protecting film.

Example 1 is described now. Note that the present invention is not limited to this example. Experiment 1 will be described in detail. However, Experiments 2-5 and Comparisons that are Experiments 6 and 7 will be described mainly for their differences from Experiment 1. Their results will be indicated in Table 1.

EXAMPLE 1

Experiment 1

The example of the invention is hereinafter described. Preparation of the Dope for Use in the Polymer Solution is indicated below.

[Materials for Dope]

100 Parts by weight of particles of cellulose triacetate (substitution degree: 2.84, viscosity average degree of polymerization (DP): 306, water content: 0.2 wt. %, viscosity of 6 wt. % dichloromethane solution: 315 mPa·s, average particle diameter and standard deviation of the particle diameter: 1.5 mm and 0.5 mm);

320 parts by weight of dichloromethane, as a first solvent;

83 parts by weight of methanol, as a second solvent;

3 parts by weight of 1-butanol, as a third solvent;

7.6 parts by weight of triphenylphosphate as plasticizer A;

3.8 parts by weight of diphenylphosphate as plasticizer B;

0.7 part by weight of 2(2'-hydroxy-3',5'-di-tert-butylphenyl) benzotriazol, as UV absorber a;

0.3 part by weight of 2(2'-hydroxy-3',5'-di-tert-amylphenyl) 5-chlorobenzotriazol, as UV absorber b;

0.006 part by weight of mixture of citrate esters (mixture of citric acid, citrate monoethyl ester, citrate diethyl ester, and citrate triethyl ester);

0.05 part by weight of fine particles of silicon dioxide with a particle diameter of 15 nm, and Mohs hardness number of approx. 7.

[Cellulose Triacetate]

In the cellulose triacetate (TAC), an amount of the residual acetic acid was 0.1 wt. % or less. The TAC contained 58 ppm of Ca, 42 ppm of Mg, 0.5 ppm of Fe, 40 ppm of the free acid content of acetic acid, and 15 ppm of sulfur ion. In the TAC, a degree of acetyl substitution of the 6-position was 0.91. A ratio of the acetyl group of the substitution of the 6-position relative to all of the acyl groups was 32.5%. In the TAC, an extracted amount of acetone was 8 wt. %. A ratio of the weight average molecular weight to the number average molecular weight was 2.5. In the TAC, the yellow index was 1.7. The haze was 0.08. A factor of transparency was 93.5%. The glass transition temperature Tg measured by the DSC (Differential Scanning Calorimetry) was 160 deg. C. An amount of heat of crystallization was 6.4 J per gram. Raw material of cellulose for the TAC was fibrous material collected from cotton. The TAC herein will be referred to as cotton-derived TAC.

Exp. 1, Step 1: Preparation of Dope

The dissolving tank or reservoir of stainless steel was 4,000 liters large, and mixed delivered solvents by stirring to obtain mixed solvent. All of the solvent for use had the water content of 0.5 wt. % or less. Then the hopper added TAC flake or powder gradually to the mixed solvent. The inside of the dissolving tank was stirred for a first dispersing step by use of the dissolver stirrer and the anchor stirrer for 30 minutes at a prescribed shear rate, the dissolver stirrer stirring at 5 m/sec as a peripheral speed for the shear rate, the anchor stirrer stirring at 1 m/sec as a peripheral speed for the shear rate. The temperature was 25 deg. C. at the start of the dispersion, and 48 deg. C. at the final step of the dispersion. The mixed solvent containing the above plural solvents was stored in the dissolving tank, and stirred and dispersed, while TAC flake was added to the mixed solvent by the hopper, to prepare the composition with a weight of 2,000 kg. After the dispersion, the stirring at the high speed was stopped. The anchor stirrer stirred further for 100 minutes at the peripheral speed of 0.5 m/sec, to obtain the swollen liquid by swelling the TAC flake. Before the end of the swelling, the inside of the tank was pressurized with gaseous nitrogen at 0.12 MPa. The oxygen density was 2 vol. % or less, and was kept safe in view of an explosion-proof structure. A water content in the dope was 0.3 wt. %.

Exp. 1, Step 2: Dissolving and Filtration

The swollen liquid was delivered through the conduit with a jacket from the dissolving tank or reservoir. The conduit with the jacket heated the swollen liquid up to 50 deg. C., and further heated the swollen liquid to 90 deg. C. during application of pressure of 2 MPa, for complete dissolution. Time in the course of heating was 15 minutes. Then the swollen liquid was cooled by the temperature adjuster down to 36 deg. C., and caused to pass the filtration device having a filter with a nominal pore diameter of 8 microns, to obtain dope (unconcentrated dope). Pressure on the primary side of the filtration was 1.5 MPa. Pressure on the secondary side of the filtration was 1.2 MPa. Elements of metal subjected to high temperature were formed from alloy with a trade name of Hastelloy, the elements including the filter, housing and conduits. The metal had high resistance to corrosion. Those elements were provided with a jacket for flow of heat exchange medium for controlling heat.

Exp. 1, Step 3: Condensation, Filtration, Defoaming and Addition of Agents

The dope 22 before the concentration was flushed in the flushing machine conditioned at 80 deg. C. with an atmospheric pressure. Solvent was liquefied, collected and separated by the solvent recovery device. The amount of the solid content of the flushed dope 22 was 21.8 wt. %. The collected solvent was adjusted for preparation by the solvent regenerator for reuse. After the regeneration in the solvent regenerator, the solvent was sent to the solvent tank. Distillation and dehydration were effected in the solvent recovery device and the solvent regenerator. A flushing tank in the flushing machine included an anchor stirrer (not shown) at the center. The anchor stirrer stirred the dope 22 for eliminating bubbles by rotations at the peripheral speed of 0.5 m/sec. Temperature of the dope 22 in the flushing tank was 25 deg. C. Average time of stay in the tank of the dope 22 was 50 minutes. Shear viscosity of the dope 22 at 25 deg. C. was 450 Pa·s at the shear rate of 10 (/sec).

Then bubbles were eliminated from the dope by ultrasonic waves of low energy for defoaming. The pump was used for the dope to flow to the filtration device in a pressurized state of 1.5 MPa. In the filtration device, the dope was passed through a sintered fiber/metal filter with a nominal minimum pore diameter of 10 microns, and then through a sintered fiber filter with a nominal minimum pore diameter of 10 microns. For those filters, the primary pressure was respectively 1.5 and 1.2 MPa, the secondary pressure being respectively 1.0 and 0.8 MPa. The filtrated dope was conditioned at the temperature of 36 deg. C., and stored in the storing tank or reservoir 21 of stainless steel and 2,000 liters large. The dope 22 of this state is referred to herein as raw material dope. The tank 21 contained the anchor stirrer 61 at its center, and stirred the dope 22 incessantly at a peripheral speed of 0.3 m/sec. As a result, no problem of corrosion or the like occurred in portions of device elements contacting the dope in preparing the dope 22 from that before the concentration.

Also, a mixed solvent B was prepared, and contained 86.5 parts by weight of dichloromethane, 13 parts by weight of acetone, and 0.5 part by weight of 1-butanol.

Exp. 1, Step 4: Ejection, Addition, Casting and Decompression

The polymer film producing system 20 in FIG. 1 was used to form the polymer film 82. The dope 22 in the storing tank or reservoir 21 was delivered by the gear pump 62 of high precision type to the filtration device 30. The gear pump 62 was according to feedback control of an inverter motor in such a manner as to set the pressure of a primary side at 0.8 MPa. The gear pump 62 had a volume efficiency of 99.2%, and a ratio of fluctuation of 0.5% or less in the ejected amount. A pressure of ejection of the gear pump 62 was 1.5 MPa. The dope 22 passed in the filtration device 30 was sent to the casting die 31.

The dope 22 was cast by controlling its flow rate at the casting die 31 so as to obtain the polymer film 82 with a web width of 1.8 meters, and a thickness in a dried state of 80 microns. A casting dope width of the dope 22 at the casting die 31 was 1,700 mm. A jacket (not shown) was provided in combination with the casting die 31, for maintaining the heat exchange medium at the temperature 36 deg. C. at an upstream end of the jacket, for setting the dope 22 at 36 deg. C.

Any one of the casting die 31, the conduits were kept warm at 36 deg. C. in the course of casting to form film. The casting die 31 was a coat hanger type. The casting die 31 had thickness adjusting die bolts or heat bolts arranged at a pitch of 20 mm. The die bolts were adapted to automatic adjustment of the thickness. The die bolts are constructed to set up a specific profile according to a flow amount of the high-precision gear pump 62 by a stored program, and also are capable of feedback control according to an adjusting program based on the specific profile of an infrared thickness meter (not shown) installed in the polymer film producing system 20. A difference between two points of any combination which are on the polymer film and distant to one another at 50 mm was equal to or less than 1 micron except for edge portions being 20 mm wide. The greatest difference between minimum values of the thickness in the width direction was set equal to or less than 3 microns per meter. Precision in the thickness was so determined that an average error in the total film thickness was equal to or less than 1.5%.

The decompressing chamber 68 was connected with the casting die 31 for negative pressure on the primary side. The decompressing chamber 68 was structured to create a difference in the pressure in a range of 1-5,000 Pa between two sides defined by the casting bead, and was adjustable according to the casting speed. The difference in pressure was determined so as to set a length of the casting bead at 20-50 mm. Also, a mechanism of the decompressing chamber 68 was structured to set the chamber temperature higher than a condensation temperature of ambient gas present around the position of casting. A labyrinth packing (not shown) was disposed at least one of the two sides defined by the casting bead. Also, openings were formed in lateral ends of the die slot of the casting die 31. The decompressing chamber 68 had an edge suction device (not shown), secured to the casting die 31, for eliminating irregularity in side edges of the casting bead.

Exp. 1, Step 5: Casting Die

A material of the casting die 31 was stainless steel of a type of precipitation hardening, had a coefficient of thermal expansion of $2 \times 10^{-5}$ (/deg. C.) or less. This had a corrosion resistance equal to that of SUS 316 steel according to forced corrosion test in electrolytic aqueous solution. Also, the material of the casting die 31 had the corrosion resistance sufficient for prevention of pitting on the gas-liquid interface even after dipping in a liquid mixture of dichloromethane, methanol and water for three (3) months. Surfaces of the casting die 31 to contact the liquid were formed with precision to have a surface roughness of 1 micron or less, and a degree of straightness of 1 micron per meter or less in any direction. A clearance of the die slot was determined as 1.5 mm. Corner portions at the end of the die lip to contact the liquid were shaped so as to set a radius of curvature R at 50 microns or less. The shear rate of the dope 22 inside the casting die 31 was in a range of 1-5,000 (1/sec). The end of the lip of the casting die 31 was coated with a WC coating by a thermal spray process, to form a hardened layer.

The mixed solvent B for imparting solubility to the dope 22 was delivered at a rate of 0.5 ml/min per each web edge to a gas-liquid interface between an end of the bead and the die slot of the casting die 31, for the purpose of local drying and local agglutination of the dope 22 at the slot ends of the casting die 31. A pump for delivering the mixed solvent had a fluctuation ratio of 5% or lower. The decompressing chamber 68 decompressed and provided 150 Pa of a pressure difference by which the pressure on the rear of the bead was lower. The jacket (not shown) was connected for keeping the decompressing chamber 68 at a constant internal temperature. A heat exchange medium conditioned at 35 deg. C. was caused to flow through the jacket. A suction device for suction of web edges was adjustable in a range of 1-100 liters per minute, and were adjusted according to the example in a range of 30-40 liters per minute in operation.

Exp. 1, Step 6: Support of Metal

The casting support band 34 was an endless band of stainless steel, and was 2.1 meters wide and 70 meters long. A thickness of the casting support band 34 was 1.5 mm. A surface roughness of the casting support band 34 was 0.05 micron or less owing to polishing the band surface. The material of the casting support band 34 was SUS 316, and had sufficient strength and resistance to corrosion. Irregularity of the thickness of the casting support band 34 was 0.5% or less. The casting support band 34 was driven to turn by the rotatable rolls 32 and 33. Tension exerted in the casting support band 34 in rotation of the rotatable rolls 32 and 33 for driving was controlled and regulated at a level of $1.5 \times 10^5$ N per sq. meter. A difference in the speed between the casting support band 34 and the rotatable rolls 32 and 33 was regulated at 0.01 m/min or less. A fluctuation in the speed of the casting support band 34 was 0.5% or less. A zigzag movement of the casting support band 34 in the band width direction was limited to 1.5 mm or less during one turn of the casting support band 34 by monitoring band edges. An under-die portion of the casting support band 34 directly under the casting die 31 was kept from moving beyond a range of 200 microns in a vertical direction from the end of the die lip. The casting support band 34 was contained in the casting chamber 64 which had a mechanism (not shown) for suppressing fluctuation of gas pressure. The dope 22 was cast by the casting die 31 on to the casting support band 34.

A flow conduit for a heat exchange medium was formed through the rotatable rolls 32 and 33, and caused the heat exchange medium to keep the rotatable rolls 32 and 33 at a target temperature by flow of the heat exchange medium at a prescribed temperature. Heat exchange medium of 8 deg. C. was introduced to the rotatable roll 33 on the side of the casting die 31. Heat exchange medium of 40 deg. C. was introduced to the rotatable roll 32 on the opposite side. The surface temperature of the rotatable roll 33 was adjusted and set at 3 deg. C. by use of the thermometer 74. Shortly before the casting, a surface temperature at the center of the casting support band 34 was 3 deg. C. A difference between the end temperatures at the end of the casting support band 34 was 1 deg. C. or less. The dew point near to the stripping position A was controlled and set at −5 deg. C. by use of the temperature adjuster 65. It was preferable to minimize the surface defects of the support which may be the casting support band 34. Specifically, an amount of a pinhole in a size of 30 microns or more was zero. An amount of a pinhole in a size equal to or more than 10 microns and less than 30 microns was one (1) or less per sq. meter. An amount of a pinhole in a size less than 10 microns was two one (2) or less per sq. meter.

Exp. 1, Step 7: Casting and Drying

The cast film 69 formed from the dope cast on the casting support band 34 was dried by dry gas initially flowing in parallel. An overall heat transfer coefficient from the dry gas to the cast film 69 was 24 kcal/m$^2$.hr. (deg. C.). The vent 70, positioned higher than the casting support band 34 at its upstream portion, blew dry gas at 135 deg. C. The vent 71, positioned higher than the casting support band 34 at its downstream portion, blew dry gas at 140 deg. C. The vent 72, positioned under the casting support band 34, blew dry gas at 65 deg. C. The saturation temperature of each of the flows of the dry gas was approximately −8 deg. C. Cool gas or cool air was blown to the cast film 69 at 5 deg. C. and a flow rate of 10 m/sec. The cooler 73 was installed so as to set the cooling region with a length of 20% of a length of the casting support band 34. Oxygen density at the casting support band 34 in the dry atmosphere was kept at 5 vol. %. Also, gaseous nitrogen was substituted for air to keep 5 vol. % of the dry atmosphere. The condenser 66 was installed for condensing and collecting solvent in the condenser 66, and had an exit or downstream end conditioned at −10 deg. C.

The gas blocking panel 75 operated for five (5) seconds after the casting, and regulated the change in the static pressure near to the casting die 31 in a range of 1 Pa or less, by preventing the dry gas from directly striking the dope or the cast film 69. When an amount of the solvent in the cast film 69 became down to 50 wt. % according to the dry base, the stripping roll 77 was driven to support and strip the self-supporting cast film 76 from the casting support band 34. Note that the amount of the contained solvent according to the dry base is calculated as [(x−y)/y]0.100, where x is a weight of the film at the time of sampling, and y is a weight of the same after drying. Tension of stripping was 1×10$^2$ N per sq. mm. For the purpose of suppressing failure in the stripping, a stripping speed or stripping roll draw was adjusted in a range of 100.1-110% of a speed of the casting support band 34. A film surface temperature of the self-supporting cast film 76 was measured, and found 5 deg. C. An average of a drying speed on the casting support band 34 was 60 wt. % of the solvent of the solvent per minute according to the dry base of the solvent. Solvent gas was obtained by the evaporation, and condensed by the condenser 66 conditioned at −10 deg. C., and collected by the solvent recovery device 67. Water in the collected solvent was conditioned with a water content of 0.5% or less. The dry gas after removal of the solvent was heated again, and reused as dry gas for blowing. The self-supporting cast film 76 was transported by the rollers in the transition assembly 80 and to the tenter type of drier 35. Dry gas at 40 deg. C. was blown by the blowing machine 81 to the self-supporting cast film 76. While the rolls transport the self-supporting cast film 76 in the transition assembly 80, tension of approximately 30 N was applied to the self-supporting cast film 76.

Exp. 1, Step 8: Tentering, Drying and Web Edge Slitting

The self-supporting cast film 76 upon entry in the tenter type of drier 35 was fed in the drying zones in the tenter type of drier 35 while retained by tenter clips on the web edges, and dried by dry gas. The tenter clips were cooled or thermally controlled by heat exchange medium of 20 deg. C. by flow through the conduits in those. A chain was used to drive the tenter type of drier 35. Fluctuation in the speed of the sprocket of the chain was 0.5% or less. There were three (3) zones defined in the tenter type of drier 35. Temperature of dry gas for those zones was conditioned at respectively 90, 110 and 120 deg. C. in the order in the stretching direction. Composition of the dry gas had saturation gas density of −10 deg. C. An average drying speed in the tenter type of drier 35 was 120 wt. %/min with reference to the dry base. The drying zones were conditioned so that the amount of the residual amount of the polymer film was 7 wt. % at the downstream end of the tenter type of drier 35. The polymer film 82 was also stretched in the web width direction while transported in the tenter type of drier 35. Tension in the wed width direction was so set that a width of the self-supporting cast film 76 after the stretch was 103% as much as that of the self-supporting cast film 76 before the stretch. A stretching ratio from the stripping roll 77 to the tenter type of drier 35, namely, tentering machine driving draw, was 102%.

In relation to the stretching ratio inside the tenter type of drier 35, a difference in the substantial stretching ratio at a portion 10 mm or more distant from the upstream tentering end was 10% or less. A difference in the stretching ratio between any two points 20 mm distant from one another was 5% or less. A ratio of a size of the base end fixed by the tentering machine to a size being not fixed was 90%. The solvent gasified in the tenter type of drier 35 was condensed at the temperature of −10 deg. C. into a liquid phase and collected. A condenser (not shown) was used, of which the exit or downstream end was conditioned at −8 deg. C. Furthermore, the solvent was regenerated for the reuse by adjusting the amount of its water content at 0.5 wt. % or less. Finally, the polymer film 82 was fed forwards from the tenter type of drier 35.

Web edges of the polymer film 82 were slitted by the web edge slitter 40 within 30 seconds after moving from the tenter type of drier 35. An NT cutter in the web edge slitter 40 slitted the web edges being 50 mm wide. A cutter blower (not shown) moved the obtained web edge portions by blowing into the film grinder or crusher 90, which ground the web edge portions into chips or particles with an average area of 80 sq. mm. The chips were utilized as raw material for regeneration in producing the dope together with the TAC flake. In the dry atmosphere of the tenter type of drier 35, density of the oxygen was kept at 5 vol. %. To keep the density of the oxygen, gaseous nitrogen was used for substitution in air.

There was a pre-drying chamber (not shown), which heated the polymer film 82 in a preliminary manner with dry gas of 100 deg. C. before drying in the drying chamber 41.

Exp. 1, Step 9: Posterior Drying and Electrostatic Elimination

The drying chamber 41 dried the polymer film 82 at a high temperature. Four zones were defined inside the drying chamber 41. Blowers (not shown) or fans caused dry gas to blow the polymer film 82 at 120, 130, 130 and 130 deg. C. associated with respectively the zones in a downstream sequence. Tension applied to the polymer film 82 by the transport with the transport rolls 91 was 100 N/m. The polymer film 82 was dried for approximately 10 minutes until the amount of the residual solvent came down to 0.3 wt. %. Wrap angles of the transport rolls 91 were set 90 and 180 degrees. The transport rolls 91 were formed from aluminum or carbon steel, and coated with a hard chrome plating. A plurality of the transport rolls 91 included some prepared in a smoothly curved form, and others prepared in a matted form obtained by finish of blast. A range of film shakes due to rotations of the transport rolls 91 was 50 microns or less. Flexure of the transport rolls 91 at the tension of 100 N per width was determined 0.5 mm or less.

The solvent gas contained in the dry gas was collectively removed by adsorption of the adsorption solvent recovery device 92. An agent for adsorption was activated carbon. Desorption after the absorption was made by use of dry nitrogen. The collected solvent was conditioned with water of 0.3 wt. % of water content, and was reused for dope regeneration. Various gaseous substances were contained in the dry gas, including the gaseous plasticizer, gaseous UV absorbers, and other substances with a high boiling point in addition to the solvent gas. Those gaseous substances were removed by cool collecting operation of a cool a pre-adsorber, and were reused in a circulated manner. The adsorption and desorption were conditioned so as to set the content of volatile organic compounds (VOC) equal to or less than 10 ppm in the waste gas in the outdoor environment. Note that approximately 90 wt. % of solvent was collected according to the condensing method. The remainder of the solvent was collected by the adsorption method.

A first humidity conditioning chamber (not shown) was supplied with the polymer film 82 after being dried. There was a transfer section between the drying chamber 41 and the first chamber. Dry gas of 110 deg. C. was caused to flow through the transfer section. In the first chamber, air of 50 deg. C. and having a dew point of 20 deg. C. was caused to blow the polymer film 82. Then the polymer film 82 was transported into a second humidity conditioning chamber (not shown) for preventing occurrence of film curls. In the second chamber, air at temperature of 90 deg. C. with humidity of 70% RH was caused to blow the polymer film 82 directly.

Exp. 1, Step 10: Knurling and Winding

After conditioning the humidity of the polymer film 82, the polymer film 82 was cooled in the cooling chamber 42 at 30 deg. C. or lower, and subjected to slitting of web edge portions in a web edge slitter (not shown). While the polymer film 82 was transported, the electrostatic elimination bar 93 electrically kept the polymer film 82 constantly in a range from −3 kV to +3 kV. Also, the knurling roll 94 knurled each of the web edge portions of the polymer film 82. The knurling was edge embossing at a width of 10 mm. A pressure for knurling was conditioned so as to obtain an average maximum height of the knurling 12 microns higher than an average thickness of the polymer film.

Then the polymer film 82 was transported into the winding chamber 43. The winding chamber 43 was kept conditioned at 28 deg. C., and 70% RH of humidity. An ion gas flow static eliminator (not shown) was installed so as to set potential of the electrified polymer film in a range from −1.5 kV to +1.5 kV. The polymer film 82 was 80 microns thick, and 1,475 mm wide. A diameter of the winding roll 95 was 169 mm. Tension was sequentially controlled, and set at 300 N per meter at the initial step of the winding, and set at 250 N per meter the end of the winding. The total length of the polymer film was 3,940 meters. With reference to the winding roll 95 of which a width of oscillation of the polymer film 82 was from −5 mm to +5 mm, a period of a fluctuation in the winding of the polymer film 82 was 400 meters. A pressure applied by the press roll 96 to the winding roll 95 was determined 50 N per meter. The polymer film while being wound had temperature of 25 deg. C., contained 1.4 wt. % of water, and contained 0.3 wt. % of residual solvent. An average rate or speed of drying in the whole process was 20 wt. % per minute according to the dry base of solvent. As a result of observation, no wrinkle or looseness of the windings were found to occur. No offsetting of the windings occurred in the test of shock at 10 G. Also, appearance of the roll of the polymer film was found agreeable.

Preservation was tested. A roll of the polymer film 82 was preserved in a rack at 25 deg. C. with 55% RH for one (1) month. The polymer film 82 after this was observed in the same manner as described above. No change was found as a result. No adhesions within the roll were found. No failure of stripping of the cast film 69 as a residue of the dope was found on the casting support band 34 after casting of the polymer film 82.

The separability of stripping of the cast film 69 in the stripping position A was observed with human eyes, and evaluated according to the following three grades.

Grade A: No shifts in the stripping position but successful stripping with uniformity Grade B: Occurrence of small shifts in the stripping position, stripping with oscillation, but without a problem as a product Grade F: Occurrence of conspicuous shifts in the stripping position to result in a problem as a product Then the cast film 69 regarding separability was found acceptable as grade A.

Also, the cloudy state of the polymer film 82 being obtained was observed with light of transmission, and evaluated according to the following three grades.

Grade A: No occurrence of the cloudy state

Grade B: Occurrence of a weakly cloudy state but without a problem as a product

Grade F: Occurrence of a conspicuous cloudy state to result in unavailability as a product Then the polymer film 82 regarding the cloudy state was found acceptable as grade A.

TABLE 1

|  | Exp. 1 | Exp. 2 | Exp. 3 | Exp. 4 |
| --- | --- | --- | --- | --- |
| Existence or lack of cooler 73 | Existed | Existed | Existed | Existed |
| Surface temperature (deg. C.) of rotatable rolls 32, 33 | 3 | 3 | 3 | 7 |
| Dew point (deg. C.) | −5 | −10 | −5 | 1 |
| Evaluated separability of stripping | A | A | B | B |
| Evaluated cloudy state | A | A | A | B |

|  | Exp. 5 | Exp. 6 (comp. 1) | Exp. 7 (comp. 2) |
| --- | --- | --- | --- |
| Existence or lack of cooler 73 | None | None | None |
| Surface temperature (deg. C.) of rotatable rolls 32, 33 | 2 | 10 | 10 |
| Dew point (deg. C.) | 5 | −10 | 10 |
| Evaluated separability of stripping | B | F | F |
| Evaluated cloudy state | B | A | F |

As observed in Table 1, cooling with the cooler 73 in Experiments 1-4 shortly before stripping the cast film 69 was found acceptable because of good separability of stripping, and a low cloudy state. The polymer film 82 without the cloudy state (A) was obtained in Experiments 1 and 2 by lowering the dew point. When there was no cooler, the polymer film 82 with separability of stripping and without the cloudy state was obtained in by lowering the surface temperature of the rotatable roll 33 on the stripping side.

INDUSTRIAL APPLICABILITY

As the self-supporting cast film is cooled shortly before stripping from the casting support band, stripping of the self-supporting cast film from the support band can be stabilized by quickening the gelling of the self-supporting cast film to increase the mechanical strength. Also, condensation of dew can be prevented, to suppress occurrence of dew or droplets of water on the self-supporting cast film. A cloudy state on the polymer film can be avoided.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

The invention claimed is:

1. A solution casting process comprising a step of:
   casting a dope containing a polymer and solvent on a first surface of a casting band which moves, to form a cast film, said casting band circulating endlessly by at least two driving rolls between which the casting band extends;
   controlling temperatures of said casting band and said cast film by said at least two driving rolls at a temperature suitable for facilitating volatilization of the solvent;
   cooling to gel said cast film to a cooling temperature lower than 6 deg. C within a predetermined cooling region, disposed to start at a stripping point for said cast film, and to extend upstream therefrom with a length equal to or less than 25% of a length of said casting support band by use of a cooling roll which is different from said at least two driving rolls and contacts a second surface of said casting band that is reverse to said first surface, or a cooler for blowing cooling gas to said cast film;
   stripping said cast film from said casting band at said stripping point;
   drying said stripped cast film to produce a polymer film, wherein a dew point of a portion around said stripping point of said cast film is set equal to or less than 0 deg. C.

2. A solution casting process as defined in claim 1, wherein said cast film is blown by cooling gas caused to flow for cooling.

3. A solution casting process as defined in claim 1, wherein a dew point of a portion around a stripping point of said cast film is set equal to or less than 0 deg. C.

4. A solution casting process as defined in claim 1, wherein a solvent content of said solvent of a portion of said cast film at said stripping point is set in a range of more than or equal to 20 wt. % to less than or equal to 200 wt. % according to a dry base.

5. A solution casting process as defined in claim 1, wherein said polymer film is created from two or more cast films overlaid on one another, and is produced by multi casting in which plural dopes are cast at one time, or by multi casting in which plural dopes are cast one after another in positions separate from one another.

6. A solution casting process as defined in claim 5, wherein said plural dopes include a first dope for being directly cast on said casting support, and at least said first dope contains stripping accelerator among said plural dopes.

7. A solution casting process as defined in claim 6, wherein said dope contains said stripping accelerator at an amount in a range of more than or equal to $1 \times 10^{-4}$ wt. % to less than or equal to 1 wt. % with reference to 100 wt. % of said polymer of said polymer film.

8. A solution casting process as defined in claim 1, wherein, with reference to 100 wt. % of said polymer of said polymer film, said dope contains plasticizer at an amount in a range of more than or equal to 3 wt % to less than or equal to 20 wt. %, ultraviolet absorber at an amount in a range of more than or equal to 0.001 wt. % to less than or equal to 5 wt. %, and fine particles at an amount in a range of more than or equal to 0.001 wt. % to less than or equal to 5 wt. %.

9. A solution casting process as defined in claim 1, wherein said polymer is a cellulose acylate.

* * * * *